(12) United States Patent
Akimasa

(10) Patent No.: US 8,768,554 B2
(45) Date of Patent: Jul. 1, 2014

(54) VEHICLE POWER SOURCE DEVICE

(75) Inventor: Koji Akimasa, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/808,609

(22) PCT Filed: Jul. 11, 2011

(86) PCT No.: PCT/JP2011/003953
§ 371 (c)(1),
(2), (4) Date: Jan. 7, 2013

(87) PCT Pub. No.: WO2012/017602
PCT Pub. Date: Feb. 9, 2012

(65) Prior Publication Data
US 2013/0110339 A1    May 2, 2013

(30) Foreign Application Priority Data

Aug. 2, 2010   (JP) .................................. 2010-173357

(51) Int. Cl.
*B60L 11/00* (2006.01)
(52) U.S. Cl.
CPC ..................................... *B60L 11/00* (2013.01)
USPC .......................................................... 701/22
(58) Field of Classification Search
USPC ........................... 701/22; 180/65.275; 307/9.1
See application file for complete search history.

(56) References Cited

U.S. PATENT DOCUMENTS

2009/0167216 A1   7/2009 Soma et al.
2010/0181828 A1   7/2010 Handa et al.

FOREIGN PATENT DOCUMENTS

| JP | 6-284509 | 10/1994 |
|---|---|---|
| JP | 6-296332 | 10/1994 |
| JP | 7-264708 | 10/1995 |
| JP | 2004-064840 | 2/2004 |
| JP | 2008-017574 | 1/2008 |
| WO | 2009/013891 | 1/2009 |

OTHER PUBLICATIONS

Machine Translation of WO 2009/013891 published Jan. 29, 2009.*
International Search Report issued Aug. 16, 2011 in International (PCT) Application No. PCT/JP2011/003953.

* cited by examiner

*Primary Examiner* — Mary Cheung
*Assistant Examiner* — Anne Mazzara
(74) *Attorney, Agent, or Firm* — Wenderoth, Lind & Ponack, L.L.P.

(57) ABSTRACT

An in-vehicle power supply device includes an electric generator, a main power supply, a DC/DC converter, a power storage unit, and a controller for controlling the DC/DC converter. The DC/DC converter stores regenerative electric power generated by the electric generator, and discharges the stored regenerative electric power to the main power supply and the load. The controller stops the DC/DC converter when a charging-status value is not larger than a predetermined lower limit value. Additionally, the controller activates the DC/DC converter when the charging-status value is larger than the lower limit value and the vehicle ends deceleration; and activates the DC/DC converter when a speed of the vehicle is not lower than a predetermined speed and an accelerator position of the engine is not larger than a predetermined accelerator position even if the charging-status value is not larger than the predetermined lower limit value.

6 Claims, 9 Drawing Sheets

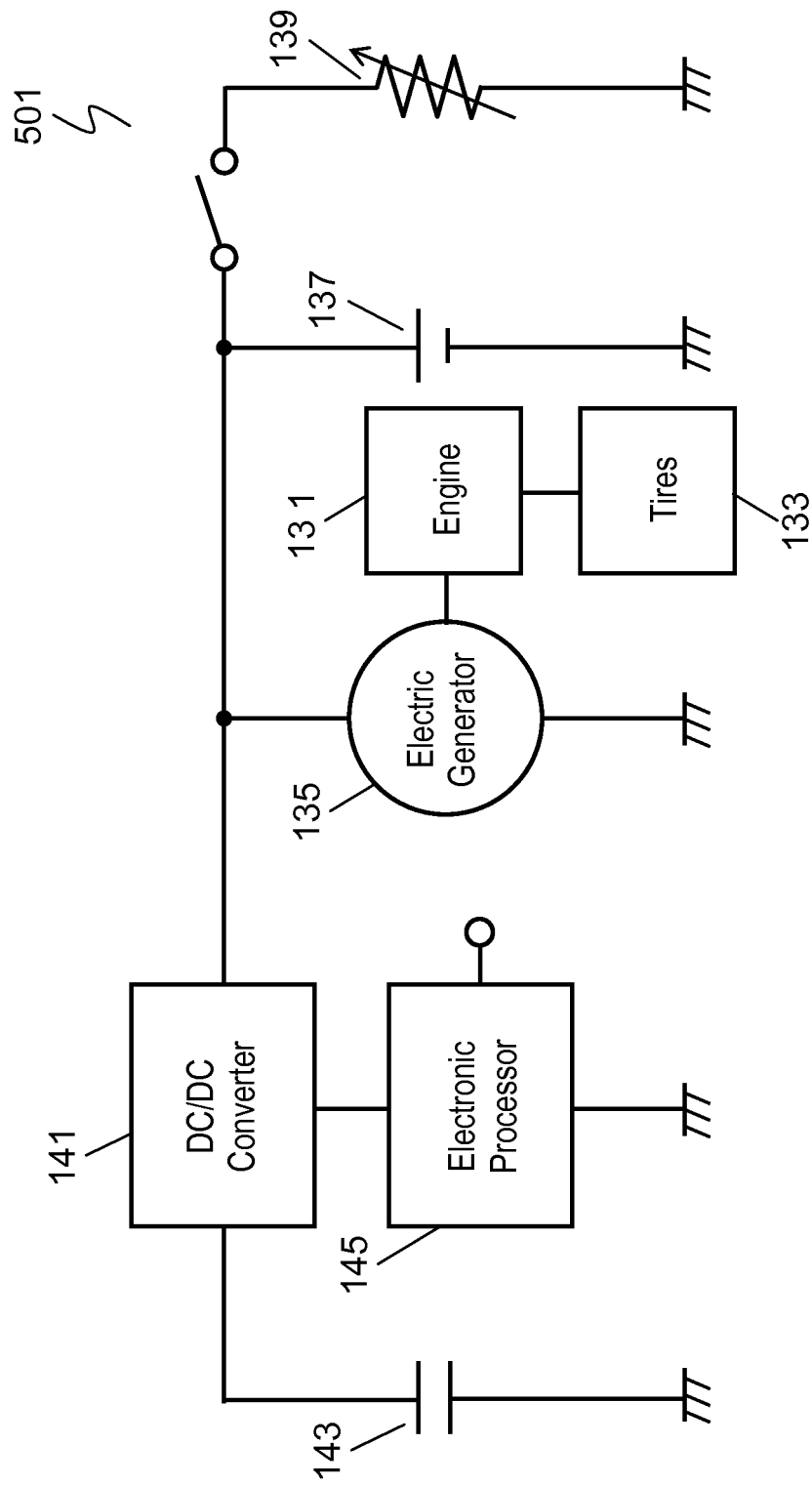
FIG. 7 – PRIOR ART

VEHICLE POWER SOURCE DEVICE

This application is a U.S. national stage application of the PCT international application No. PCT/JP2011/003953, filed Jul. 11, 2011.

BACKGROUND

1. Technical Field

The present invention relates to in-vehicle power supply devices that have a function of recovering their regenerative electric power.

2. Background Art

In recent years, vehicles have been developed which have a function of recovering power during deceleration for fuel savings. For such vehicles, a variety of in-vehicle power supply devices for use in vehicles have been proposed. FIG. 7 is a schematic diagram of in-vehicle power supply device 501 disclosed in Patent Literature 1. Engine 131 of the vehicle is mechanically connected to tires 133 and electric generator 135. Electric generator 135 is electrically connected to battery 137 and vehicle electric load 139. Vehicle electric load 139 includes a starter. Electric generator 135 is electrically connected to electric double-layer capacitor 143 via DC/DC converter 141. DC/DC converter 141 is controlled by electronic processor 145.

An operation of in-vehicle power supply device 501 will be described below. Regenerative electric power is produced by driving electric generator 135 during a period of deceleration of the vehicle. Then, electronic processor 145 controls DC/DC converter 141 to charge electric double-layer capacitor 143. As a result, the regenerative electric power is stored in electric double-layer capacitor 143. After that, upon finishing the deceleration of the vehicle, electronic processor 145 controls DC/DC converter 141 to discharge electric double-layer capacitor 143 to battery 137. As a result, the regenerative electric power stored in electric double-layer capacitor 143 is supplied to battery 137 and vehicle electric load 139, which allows fuel savings of the vehicle.

In-vehicle power supply device 501 shown in FIG. 7 can provide an effective utilization of the regenerative electric power. Electronic processor 145 allows the regenerative electric power to be stored in electric double-layer capacitor 143 during the deceleration of the vehicle. After finishing the deceleration of the vehicle, and during an operation (such as acceleration, constant-speed travelling, and idling) beside deceleration, electronic processor 145 controls DC/DC converter 141 to discharge electric double-layer capacitor 143 to battery 137. Therefore, DC/DC converter 141 always operates during usage of the vehicle. Electronic processor 145 operates DC/DC converter 141 such that the voltage of electric double-layer capacitor 143 is held at the withstand voltage to prevent overcharge of the capacitor after electric double-layer capacitor 143 has been charged up to the withstand voltage thereof. Similarly, when discharging electric double-layer capacitor 143, electronic processor 145 operates DC/DC converter 141 such that the voltage of electric double-layer capacitor 143 is held at a lower limit voltage of the capacitor to prevent over-discharge of the capacitor. This operation produces a period during which DC/DC converter 141 operates only for holding the voltage of electric double-layer capacitor 143. During the period, electric double-layer capacitor 143 are neither charged nor discharged, the power consumed for operating DC/DC converter 141 is wasted, resulting in a decrease in total efficiency of the vehicle.

CITATION LIST

Patent Literature

Patent Literature 1: Japanese Patent No. 3465293

SUMMARY

An in-vehicle power supply device includes an electric generator, a main power supply, a DC/DC converter, a power storage unit connected with the electric generator via the DC/DC converter, and a controller for controlling the DC/DC converter. The DC/DC converter is operable to charge the power storage unit with regenerative electric power generated by the electric generator to store the regenerative electric power in the power storage unit, and to discharge the stored regenerative electric power from the power storage unit to the main power supply and the load. The controller is operable to stop the DC/DC converter when a charging-status value indicating a charging status of the power storage unit is not larger than a predetermined lower limit value. The controller is operable to activate the DC/DC converter when the charging-status value is larger than the lower limit value and the vehicle ends deceleration. The controller is operable to activate the DC/DC converter when a speed of the vehicle is not lower than a predetermined speed and an accelerator position of the engine is not larger than a predetermined accelerator position even if the charging-status value is not larger than the predetermined lower limit value.

The in-vehicle power supply device is capable of reducing power consumption of the DC/DC converter, with the recovery efficiency of the regenerative electric power being held, thereby resulting in a higher efficiency of the device.

BRIEF DESCRIPTION OF THE DRAWINGS

FIG. 7 is a schematic diagram of a conventional in-vehicle power supply device.

DETAILED DESCRIPTION

Exemplary Embodiment 1

Figure 1:
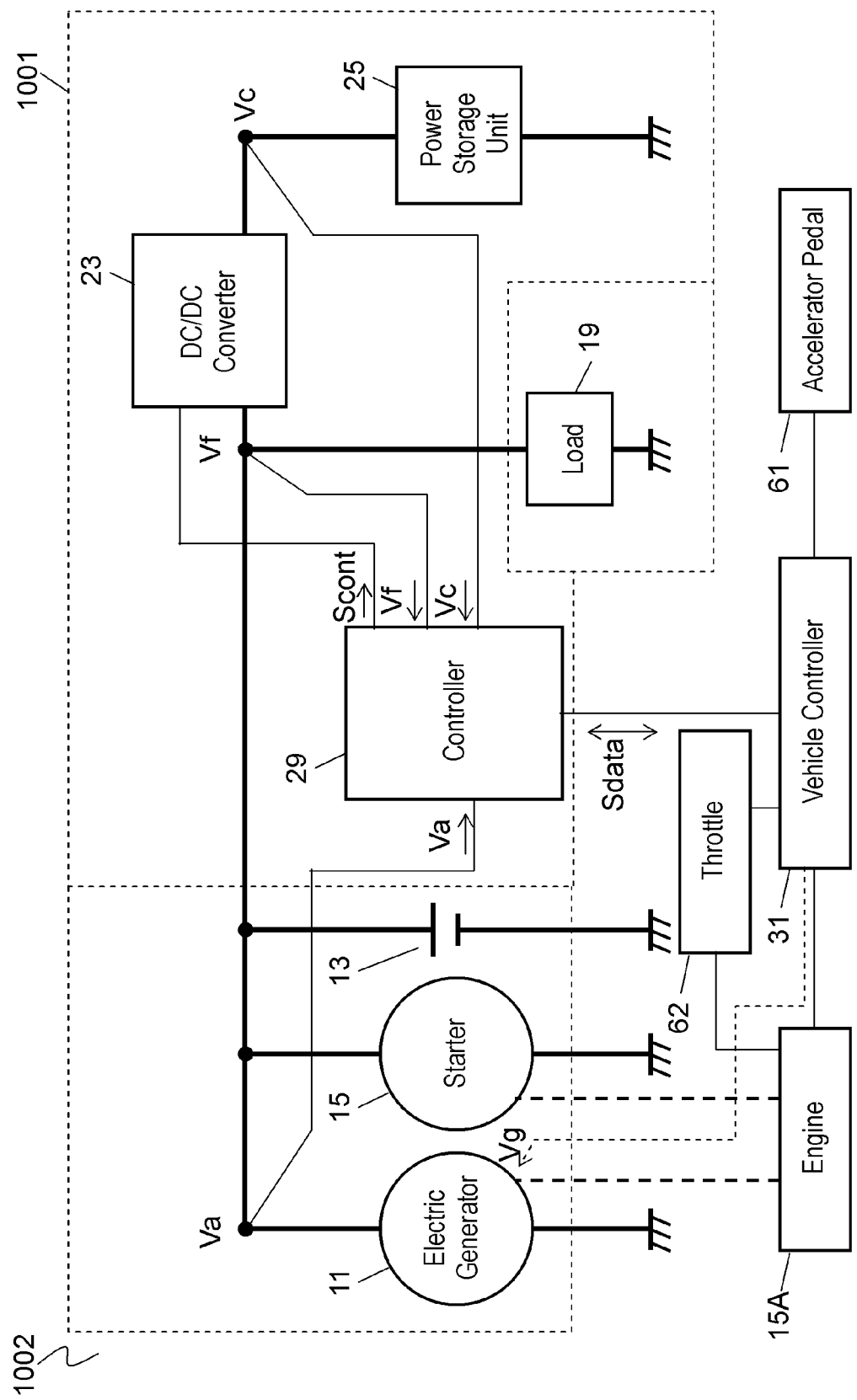
FIG. 1 is a block circuit diagram of an in-vehicle power supply device according to Exemplary Embodiment 1 of the present invention.

FIG. 1 is a block circuit diagram of in-vehicle power supply device 1001 for use in a vehicle according to Exemplary Embodiment 1 of the present invention. Vehicle 1002 has engine 15A, electric generator 11, starter 15, main power supply 13, vehicle control circuit 31, load 19, and in-vehicle power supply device 1001 which are mounted to the vehicle.

Electric generator 11 is electrically coupled with main power supply 13, starter 15, and load 19. Electric generator 11 is driven by engine 15A to generate electric power. The generated electric power includes electric power generated by engine 15A with fuel consumption and regenerative electric power generated by a kinetic energy when vehicle 1002 is in inertial traveling in a fuel-cut state in which fuel supply to engine 15A is halted. In vehicle 1002 according to Embodiment 1, vehicle control circuit 31 controls throttle 62 and engine 15A such that if vehicle speed "v" becomes lower than predetermined speed "vk" even during deceleration, fuel is injected to drive engine 15A to avoid engine 15A from stalling. Accordingly, when vehicle speed "v" is lower than predetermined speed "vk" even during the deceleration, the electric power generated by electric generator 11 is not the regenerative electric power. Predetermined speed "vk" is previously determined for each vehicle. Predetermined speed "vk" is 10 km/h for vehicle 1002 according to Embodiment 1.

Main power supply 13 is implemented by a secondary battery, such as a lead-acid battery. Starter 15 is mechanically coupled with engine 15A to start engine 15A. Load 19 contains electrical components, such as a navigation device, an audio/visual device, and lighting devices, installed in vehicle 1002.

Vehicle 1002 further includes accelerator pedal 61 and throttle 62 which both are coupled with vehicle control circuit 31. Vehicle control circuit 31 controls the amounts of air and fuel which throttle 62 supplies to engine 15A, by controlling a throttle position of throttle 62 (an accelerator position) in accordance with a state of accelerator pedal 61 being pedaled.

In-vehicle power supply device 1001 includes DC/DC converter 23, power storage unit 25, and controller 29. In-vehicle power supply device 1001 may further include electric generator 11, starter 15, and main power supply 13. Load 19 is configured to be electrically coupled with power storage unit 25 via DC/DC converter 23. DC/DC converter 23 controls charging and discharging of power storage unit 25. That is, when electric generator 11 generates the regenerative electric power, DC/DC converter 23 operates to charge the regenerative electric power into power storage unit 25. When no regenerative electric power is generated, DC/DC converter 23 operates to discharge the regenerative electric power which is stored in power storage unit 25 to main power supply 13 and load 19 in accordance with the state of vehicle 1002.

As described above, power storage unit 25 stores the regenerative electric power which is generated during a deceleration of vehicle 1002. Since the regenerative electric power is generated abruptly, in order to sufficiently store the regenerative electric power, power storage unit 25 is implemented by a capacitor, such as an electric double-layer capacitor that has a good charging-acceptance property, having a large capacitance. The number of the electric double-layer capacitors and the electrical connection thereof (in series, parallel, or series parallel) are appropriately determined in accordance with a power specification required for vehicle 1002. According to Embodiment 1, power storage unit 25 is implemented by five electric double-layer capacitors each having a rated voltage of 2.5 V, with the capacitors connected in series with each other. Therefore, power storage unit 25 can be charged until storage unit voltage Vc, the voltage across both ends of power storage unit 25, increases up to 12.5 V. Here, the upper limit of voltage of storage unit voltage Vc is upper limit voltage Vcu. In order to avoid over-discharge during discharge, power storage unit 25 can be discharged until the voltage decreases to 1 V per one electric double-layer capacitor, that is, storage unit voltage Vc decreases to 5 V. The lower limit of voltage of storage unit voltage Vc is lower limit voltage Vck to avoid glitches, such as over-discharge, of power storage unit 25. Power storage unit 25 can be used within the range of storage unit voltage Vc that ranges from lower limit voltage Vck (=5V) to upper limit voltage Vcu (=12.5V). DC/DC converter 23 controls storage unit voltage Vc, such that storage unit voltage Vc is not out of the range.

In the case that power storage unit 25 employs the electric double-layer capacitor, the amount of the regenerative electric power stored in power storage unit 25 is proportional to storage unit voltage Vc. Charging-status value SOC is defined as an index indicating the amount of the electric power stored in power storage unit 25. According to Embodiment 1, charging-status value SOC is storage unit voltage Vc. In the following descriptions of in-vehicle power supply device 1001, upper limit value SOCu and lower limit value SOCk of charging-status value SOC are upper limit voltage Vcu and lower limit voltage Vck of storage unit voltage Vc, respectively.

DC/DC converter 23 is electrically coupled with controller 29 via signal interconnections. Controller 29 includes a microcomputer, memory, and peripheral circuits. Controller 29 controls DC/DC converter 23 with control signal Scont. Controller 29 has a function to detect voltages. Controller 29 is electrically coupled, via the signal interconnections, with a positive terminal of electric generator 11, a positive terminal of load 19, and a positive terminal of power storage unit 25. This connection allows controller 29 to detect electric generator voltage Va of electric generator 11, load voltage Vf of load 19, and storage unit voltage Vc of power storage unit 25.

Controller 29 is also electrically coupled with vehicle control circuit 31 via the signal interconnections. Vehicle control circuit 31 totally controls vehicle 1002 in the following manner. The vehicle control circuit sends signals indicating various states of vehicle 1002 to controller 29, by means of data signal Sdata in accordance with an in-vehicle communication standard. The vehicle control circuit receives from controller 29 various information including voltages of parts, and operation status of DC/DC converter 23. Although electric generator 11 and starter 15 are controlled by vehicle control circuit 31 via the signal interconnections, the signal interconnections are not shown in FIG. 1 due to complex indications thereof. Electric generator 11 outputs electric generator voltage Va in accordance with voltage-instruction value Vg that is output from vehicle control circuit 31. According to Embodiment 1, voltage-instruction value Vg is set to 14.5 V.

Figure 2A:
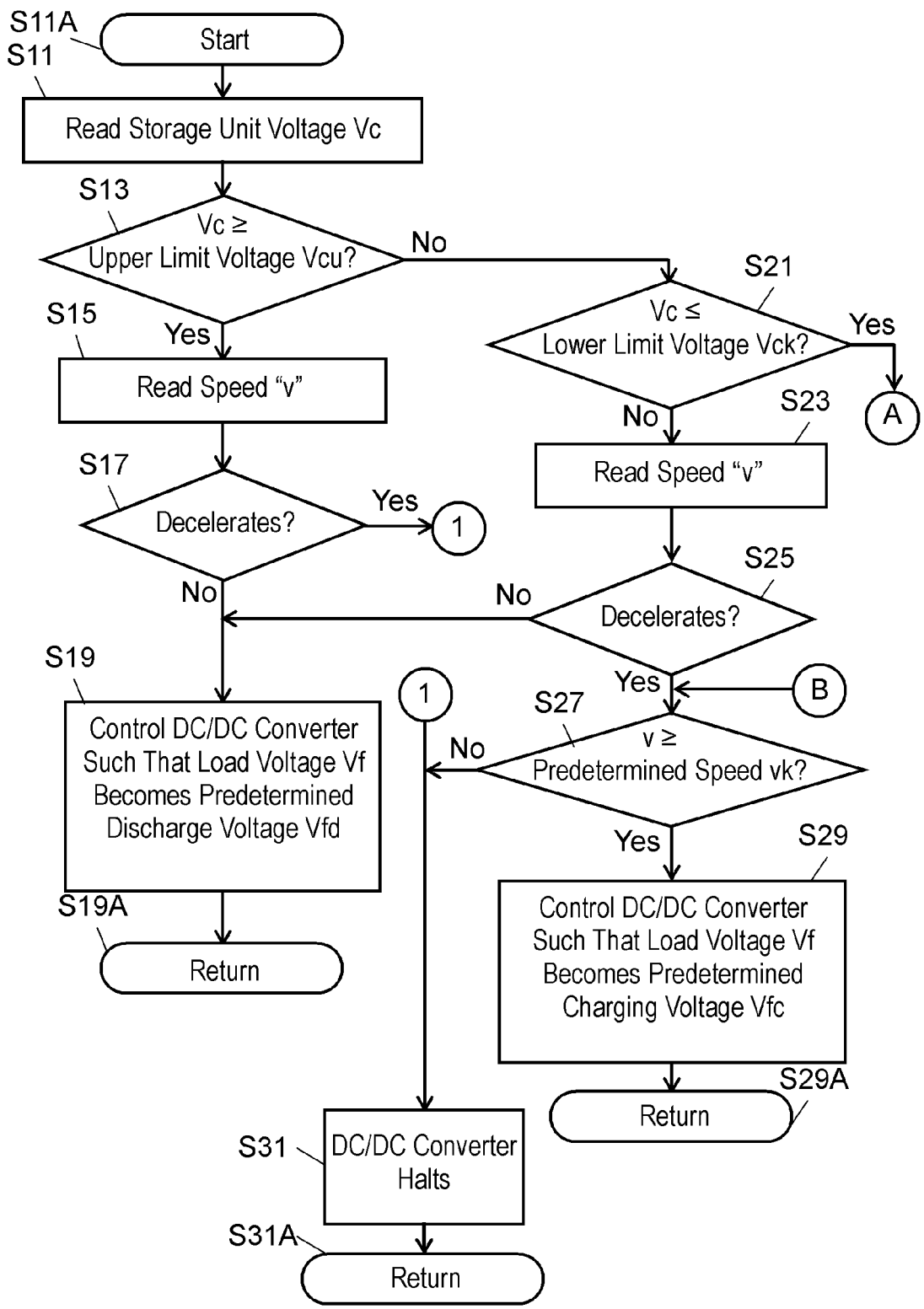
FIG. 2A is a flowchart illustrating an operation of the in-vehicle power supply device according to Embodiment 1.
Figure 2B:
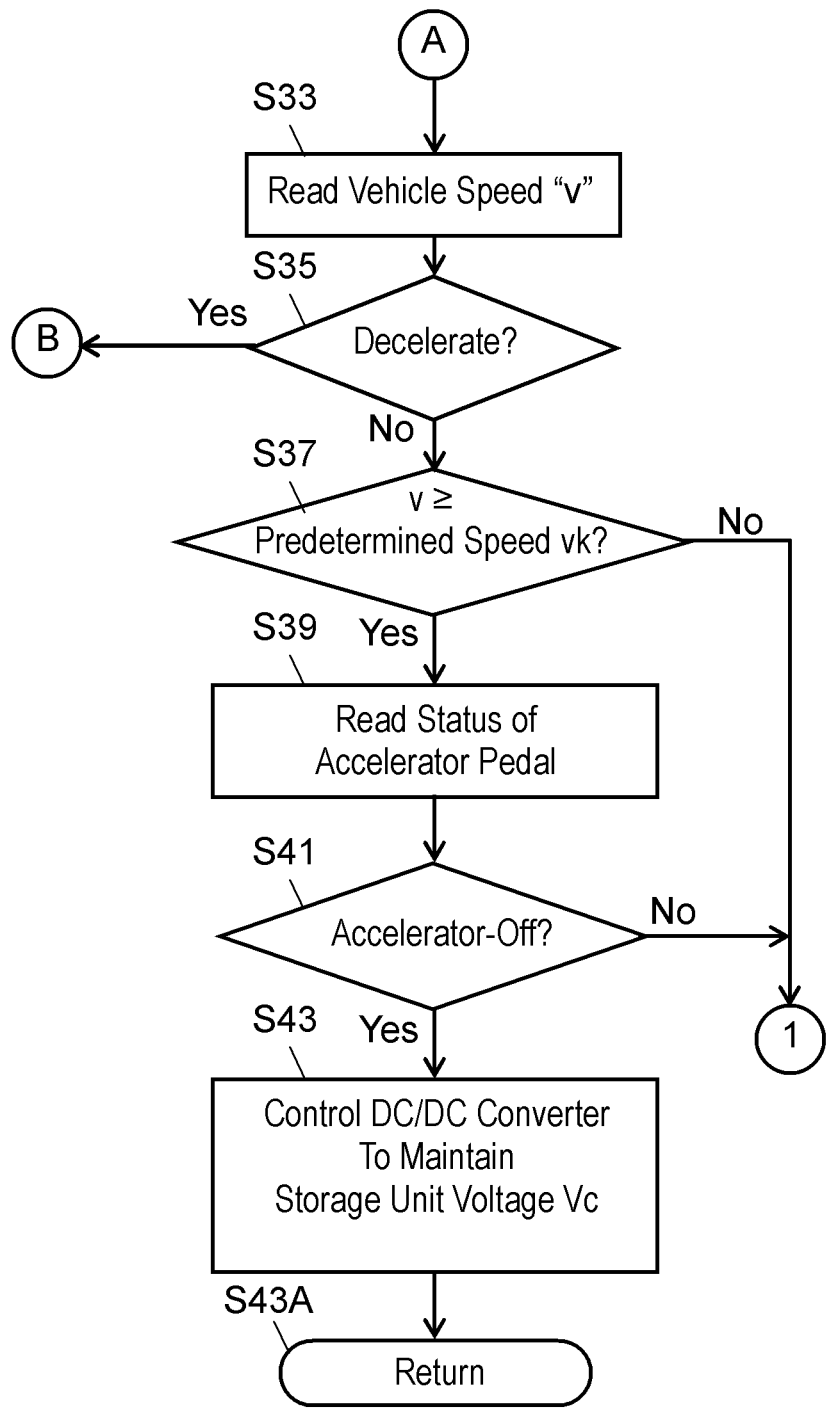
FIG. 2B is a flowchart illustrating an operation of the in-vehicle power supply device according to Embodiment 1.

An operation of in-vehicle power supply device 1001 will be described below. FIGS. 2A and 2B are flowcharts illustrating the operation of in-vehicle power supply device 1001. The flowcharts of FIGS. 2A and 2B are performed through operations by the microcomputer that operates according to a programs stored in the memory of controller 29. The flowcharts of FIGS. 2A and 2B are illustrated as subroutines which can be executed via a main routine. Therefore, the subroutines of FIGS. 2A and 2B are called by the main routine as needed, and are executed.

Upon starting the execution of the subroutines of FIGS. 2A and 2B (Step S11A), controller 29 first detects storage unit voltage Vc (Step S11), and then, compares storage unit voltage Vc with upper limit voltage Vcu (Step S13).

If storage unit voltage Vc is not lower than upper limit voltage Vcu ("Yes" at Step S13), basically, controller 29 causes DC/DC converter 23 to halt not to charge power storage unit 25 any more. However, in the case that power storage unit 25 can supply power to, e.g. main power supply 13 and load 19, controller 29 causes DC/DC converter 23 to discharge storage unit 25. This operation will be detained below.

If storage unit voltage Vc is not lower than upper limit voltage Vcu ("Yes" at Step S13), controller 29 detects vehicle speed "v" of vehicle 1002 from data signal Sdata sent from vehicle control circuit 31 (Step S15), and determines whether vehicle 1002 decelerates or not (Step S17). Here, controller 29 determines whether vehicle 1002 decelerates or not from the difference between detected vehicle speed "v" and previous vehicle speed "vo" that has been detected previously. Specifically, if vehicle speed "v" is not zero and is lower than previous vehicle speed "vo", controller 29 determines that vehicle 1002 decelerates. If vehicle speed "v" is higher than previous vehicle speed "vo", controller 29 determines that vehicle 1002 accelerates. When vehicle speed "v" is not zero and equal to previous vehicle speed "vo", controller 29 determines that vehicle 1002 travels at a constant speed. When both vehicle speed "v" and preceding vehicle speed "vo" are zero, controller 29 determines that vehicle 1002 stops. The determination made by controller 29 whether or not vehicle 1002 is in deceleration is not limited to the method described above. Controller 29 may determine whether vehicle 1002 decelerates or not from a ratio of vehicle speed "v" to previous vehicle speed "vo", or from a time-differential value of vehicle speed "v".

If vehicle 1002 decelerates at Step S17 ("Yes" at Step S17), electric generator 11 generates regenerative electric power when vehicle speed "v" is not lower than predetermined speed "vk". However, since storage unit voltage Vc is not lower than upper limit voltage Vcu, storage unit 25 can no longer be charged with the regenerative electric power. Therefore, since it is not necessary to cause DC/DC converter 23 to operate, controller 29 causes DC/DC converter 23 to halt in order to reduce power wastefully consumed by DC/DC converter 23 (Step S31), and returns to the main routine (Step S31A).

The above operation while storage unit voltage Vc is not lower than upper limit voltage Vcu ("Yes" at Step S13) and vehicle 1002 decelerates ("Yes" at Step S17), is executed either while the regenerative electric power is charged into power storage unit 25, so that storage unit voltage Vc reaches upper limit voltage Vcu. Power storage unit 25 is charged only while vehicle 1002 decelerates and generates the regenerative electric power. That is, vehicle 1002 decelerates whenever storage unit voltage Vc reaches upper limit voltage Vcu during the charging of power storage unit 25. Hence, when storage unit voltage Vc is not lower than upper limit voltage Vcu, controller 29 causes DC/DC converter 23 to halt (Step S31) and returns to the main routine (Step S31A).

On the other hand, if vehicle 1002 does not decelerates at Step S17 ("No" at Step S17), vehicle 1002 accelerates, traveling at a constant speed, or stops, i.e., vehicle 1002 is in a no deceleration state. During the no-deceleration state, the regenerative electric power is not generated. When it is determined whether vehicle 1002 decelerates or not (Step S17), storage unit voltage Vc is not lower than upper limit voltage Vcu ("Yes" at Step S13), and therefore, power storage unit 25 is fully charged with the regenerative electric power. Accordingly, controller 29 causes DC/DC converter 23 to supply the regenerative electric power stored in power storage unit 25 to main power supply 13 and load 19, for a preparation for next charging of regenerative electric power to be generated next time as much as possible, as well as for an effective utilization of the regenerative electric power. This operation results in a higher efficiency of the vehicle.

An operation of power storage unit 25 supplying the regenerative electric power to main power supply 13 and load 19 will be described below. If vehicle 1002 does not decelerate at Step 17 ("No" at Step S17), controller 29 controls DC/DC converter 23 to cause load voltage Vf to become equal to predetermined discharge voltage Vfd (Step S19). Predetermined discharge voltage Vfd is a voltage which is determined to discharge power storage unit 25 as follows.

In order to cause DC/DC converter 23 to discharge the regenerative electric power stored in power storage unit 25, controller 29 controls DC/DC converter 23 to increase load voltage Vf which is an input-output voltage of DC/DC converter 23 such that voltage Vdf become higher than the current voltage Vdf. This operation allows DC/DC converter 23 to discharge power storage unit 25 as to raise the current load voltage Vf up to predetermined discharge voltage Vfd. Controller 29 reads a current value of voltage-instruction value Vg (the constant value of 14.5 V) with data signal Sdata from vehicle control circuit 31. Then, the controller determines predetermined discharge voltage Vfd by adding predetermined voltage margin $\Delta Vf$ to the read voltage-instruction value Vg. Predetermined voltage margin $\Delta Vf$ is determined previously as an additional margin in consideration of, e.g. control accuracy of DC/DC converter 23 and detecting accuracy of electric generator voltage Va, load voltage Vf. According to Embodiment 1, predetermined voltage margin $\Delta Vf$ is 0.5 V. For example, in the case that vehicle 1002 accelerates and load voltage Vf is 14.5 V that is substantially equal to electric generator voltage Va, controller 29 determines predetermined discharge voltage Vfd to be 15 V (=14.5V+0.5V). Controller 29 controls DC/DC converter 23 such that load voltage Vf becomes equal to predetermined discharge voltage Vfd (Step S19). This allows DC/DC converter 23 to discharge the regenerative electric power stored in power storage unit 25 such that load voltage Vf, i.e. the input-output voltage, becomes 15V. As a result, the regenerative electric power is supplied to main power supply 13 and load 19, as described above, which results in an effective utilization of the regenerative electric power. In this case, since the voltage higher than electric generator voltage Va is applied to electric generator 11, the electric power generation of electric generator 11 can halt. At this moment, electric generator 11 may be mechanically decoupled from engine 15A, accordingly reducing a mechanical load on engine 15A, which results in fuel savings.

In the above example, an operation of vehicle 1002 which accelerates is described. However, the same advantages can be obtained by the same operation even in the case that the vehicle travels at a constant speed or stops accompanied by idling of engine 15A. When vehicle 1002 stops and vehicle control circuit 31 performs no idling, i.e. a halting of engine 15A, electric generator 11 is halted; however, voltage-instruction value Vg remains constant at the value of 14.5 V. This allows controller 29 to determine predetermined discharge voltage Vfd to be 15 V by adding predetermined voltage margin $\Delta Vf$ (0.5 V) to voltage-instruction value Vg (14.5 V), as described above. Accordingly, even during no idling, DC/DC converter 23 discharges the regenerative electric power stored in power storage unit 25 such that load voltage Vf, i.e. the input-output voltage, becomes equal to 15 V. The discharged regenerative electric power is supplied to main power supply 13 and load 19, resulting in an effective utilization of the power.

Thus, controller 29 controls DC/DC converter 23 to discharge power storage unit 25 such that load voltage Vf becomes equal to predetermined discharge voltage Vfd (Step S19), and then, returns to the main routine (Step S19A).

If storage unit voltage Vc is lower than upper limit voltage Vcu at Step S13 ("No" at Step S13), it is possible to charge the regenerative electric power into power storage unit 25. In this case, controller 29 compares storage unit voltage Vc with lower limit voltage Vck (Step S21).

If storage unit voltage Vc is higher than lower limit voltage Vck ("No" at Step S21), storage unit voltage Vc ranges between upper limit voltage Vcu and lower limit voltage Vck. In this case, power storage unit 25 can be charged and discharged. Specifically, the charging and discharging of power storage unit 25 are controlled as described below.

First, controller 29 reads vehicle speed "v" of vehicle 1002 (Step S23), and determines whether vehicle 1002 decelerates or not (Step S25) similarly to Step S17. If the vehicle does not decelerate at Step S25 ("No" at Step S25), electric generator 11 generates no regenerative electric power and power storage unit 25 stores regenerative electric power which can be discharged. Accordingly, at Step S19, controller 29 controls DC/DC converter 23 such that load voltage Vf becomes equal to predetermined discharge voltage Vfd.

On the other hand, if vehicle 1002 decelerates at Step S25 ("Yes" at Step S25), controller 29 determines whether or not electric generator 11 generates the regenerative electric power available for charging power storage unit 25. Specifically, controller 29 compares vehicle speed "v" with predetermined speed "vk" (Step S27). If vehicle speed "v" is not lower than predetermined speed "vk" ("Yes" at Step S27), controller 29 determines that the regenerative electric power is generated. During the deceleration of vehicle 1002 ("Yes" at Step S25), vehicle control circuit 31 halts the supply of fuel to engine 15A, thus leading to a fuel-cut state. Predetermined speed "vk" is a speed at which the fuel-cut is ended by resuming the fuel supply to engine 15A when the vehicle decelerates and in the fuel cut state. Predetermined speed "vk" is 10 km/h according to Embodiment 1. If vehicle 1002 decelerates at vehicle speed "v" lower than 100 km/h, vehicle control circuit 31 resumes the fuel injection to drive engine 15A. That is, If vehicle speed "v" is not lower than predetermined speed "vk" at Step S27 ("Yes" at Step S27), engine 15A is in the fuel cut state, and therefore, the electric power generated by electric generator 11 is the regenerative electric power. In this case, controller 29 controls DC/DC converter 23 such that load voltage Vf becomes equal to predetermined charge voltage Vfc (Step S29). As a result, power storage unit 25 is charged with the regenerative electric power.

An operation at Step S29 of in-vehicle power supply device 1001 will be detailed below. Predetermined charge voltage Vfc is the voltage that is set for charging power storage unit 25, and is determined as described below.

In order to cause DC/DC converter 23 to charge the regenerative electric power into power storage unit 25, controller 29 controls DC/DC converter 23 such that the value of load voltage Vf, i.e. the input-output voltage of DC/DC converter 23, becomes lower than a current value of the load voltage. This operation allows DC/DC converter 23 to charge power storage unit 25 such that the current value of load voltage Vf decreases down to predetermined charge voltage Vfc. Controller 29 reads current voltage-instruction value Vg (the constant value of 14.5 V) from vehicle control circuit 31, and then, determines predetermined charge voltage Vfc as follows. Predetermined voltage margin ΔVf during the discharging (Step S19) of power storage unit 25 is subtracted from the read voltage-instruction value Vg. According to Embodiment 1, predetermined voltage margin ΔVf is 0.5 V as described above.

Electric generator 11 generates the regenerative electric power at Step S29 with voltage-instruction value Vg being 14.5 V. Accordingly, controller 29 determines predetermined charge voltage Vfc to be 14V (=14.5V−0.5 V). As a result, controller 29 controls DC/DC converter 23 at Step S29 such that load voltage Vf, i.e. the input-output voltage of DC/DC converter 23, becomes equal to predetermined charge voltage Vfc (14 V), and then, returns to the main routine (Step S29A). This operation allows the regenerative electric power to be stored into power storage unit 25, using the power effectively.

Predetermined voltage margin ΔVf is determined to be 0.5 V in Steps S19 and S29, however may be appropriately determined in accordance with a control specification of DC/DC converter 23 and voltage sensing accuracy. According to Embodiment 1, although Steps S19 and S29 employ the same values of predetermined voltage margin ΔVf, these values of predetermined voltage margin ΔVf may be different from each other in the case that, for example, control accuracy of DC/DC converter 23 is different between in charging and in discharging.

At Steps S19 and S29, assuming that load voltage Vf is approximately equal to electric generator voltage Va, controller 29 determines predetermined discharge voltage Vfd and predetermined charge voltage Vfc, by adding predetermined voltage margin ΔVf to voltage-instruction value Vg or subtracting predetermined voltage margin ΔVf from voltage-instruction value Vg. Then, controller 29 controls DC/DC converter 23 such that load voltage Vf becomes equal to predetermined discharge voltage Vfd or predetermined charge voltage Vfc. However, in the case that the length of power interconnections between electric generator 11 and DC/DC converter 23 is so large that wiring resistances of the interconnections may be large, controller 29 may determine predetermined discharge voltage Vfd and predetermined charge voltage Vfc by adding predetermined voltage margin ΔVf to voltage-instruction value Vg or by subtracting predetermined voltage margin ΔVf from voltage-instruction value Vg. Then, at Steps S19 and S29, the controller may control DC/DC converter 23 such that electric generator voltage Va, instead of load voltage Vf, becomes equal to predetermined discharge voltage Vfd and predetermined charge voltage Vfc, respectively.

In general, the regenerative electric power has a large electric current which varies abruptly. Therefore, if the regenerative electric power is charged into power storage unit 25, load voltage Vf varies accordingly due to the wiring resistance. As a result, DC/DC converter 23 may not control load voltage Vf according to the variations, hence being prevented from recovering the regenerative electric power sufficiently. DC/DC converter 23 controls electric generator voltage Va to decrease an influence of the wiring resistance on the variations of voltage, hence sufficiently recovering the regenerative electric power to be charged into power storage unit 25.

If vehicle speed "v" is lower than predetermined speed "vk" at Step 27 ("No" at Step S27), vehicle 1002 ends the fuel cut state and vehicle control circuit 31 supplies fuel to drive engine 15A. In this state, if the electric power generated by electric generator 11 is charged into power storage unit 25, this charging is a charging operation accompanied by fuel consumption, decreasing efficiency. Hence, If vehicle speed "v" is lower than predetermined speed "vk" at Step 27 ("No" at Step S27), in order to halt the charging operation to power storage unit 25, controller 29 controls DC/DC converter 23 to halt (Step S31), and then returns to the main routine (Step S31A). This operation prevents DC/DC converter 23 from operating wastefully, improving efficiency.

If storage unit voltage Vc is not higher than lower limit voltage Vck at Step 21 ("Yes" at Step S21), controller 29 controls DC/DC converter 23 such that power storage unit 25 is no longer discharged. Specifically, controller 29 first detects vehicle speed "v" (Step S33), and then determines whether vehicle 1002 decelerates or not (Step S35) similarly to Steps S17 and S25. If vehicle 1002 decelerates at Step S35 ("Yes" at Step S35), controller 29 performs operations from Step S27, which is described above. That is, in the case that vehicle 1002 decelerates at Step S34 ("Yes" at Step S35), if vehicle speed "v" is not lower than predetermined speed "vk" ("Yes" at Step S27), it is possible to recover the regenerative electric power. Then, DC/DC converter 23 is controlled to charge power storage unit 25 (Step S29). In the case that vehicle 1002 decelerates at Step S35 ("Yes" at Step S35), if vehicle speed "v" is lower than predetermined speed "vk" ("No" at Step S27), storage unit voltage Vc reaches lower limit voltage Vck. Hence, controller 29 halts the operation of DC/DC converter 23 (Step S31) such that power storage unit 25 is not discharged, and then returns to the main routine (Step S31A). Thus, in the case that vehicle 1002 decelerates at Step S35 ("Yes" at Step S35), controller 29 executes one of the operations; the operation of controlling DC/DC converter 23 such that power storage unit 25 is charged with the regenerative electric power (Step S29), and the operation of halting DC/DC converter 23 (Step S31). Therefore, power storage unit 25 is no longer discharged.

On the other hand, if vehicle 1002 does not decelerate at Step S35 ("No" at Step S35), vehicle 1002 is in the no-deceleration state. In this state, controller 29 compares vehicle speed "v" with predetermined speed "vk" (Step S37). If vehicle speed "v" is lower than predetermined speed "vk" at Step S37 ("No" at Step S37), vehicle 1002 stops, accelerates, or travels at a speed lower than predetermined speed "vk". Therefore, regenerative electric power to be charged into power storage unit 25 is not generated. Moreover, since storage unit voltage Vc is not higher than lower limit voltage Vck, power storage unit 25 can be no longer discharged. Thus, since power storage unit 25 is not charged or discharged, controller 29 controls DC/DC converter 23 to halt (Step S31), and then returns to the main routine (Step S31A).

On the other hand, if vehicle speed "v" is not lower than predetermined speed "vk" at Step S37 ("Yes" at Step S37), vehicle 1002 accelerates at a speed not lower than predetermined speed "vk" or travels at a constant speed not lower than predetermined speed "vk". At this moment, since storage unit voltage Vc is not higher than lower limit voltage Vck, power storage unit 25 is not discharged, but can be charged upon generation of the regenerative electric power. However, since it is not known when the regenerative electric power is generated, DC/DC converter 23 must be started up to be on standby before the generation of the regenerative electric power. An operation of in-vehicle power supply device 1001 in the above case will be described below.

First, in order to determine whether or not it is the status in which the regenerative electric power is generated, controller 29 reads the status of the accelerator pedal with data signal Sdata that is sent from vehicle control circuit 31 (Step S39). If the accelerator pedal is pedaled and vehicle 1002 continues accelerating or traveling at a constant speed, no regenerative electric power is generated. Thus, if the status of the accelerator pedal which has been read at Step S39, is not in accelerator-off ("No" at Step S41), power storage unit 25 is neither charged nor discharged, and therefore, controller 29 controls DC/DC converter 23 to halt (Step S31), and then returns to the main routine (Step S31A).

The above operation executed in the case that: storage unit voltage Vc is lower than upper limit voltage Vcu ("No" at Step S13); storage unit voltage Vc is not higher than lower limit voltage Vck ("Yes" at Step S21); vehicle 1002 is in the no-deceleration state ("No" at Step S35); and vehicle speed "v" is lower than predetermined speed "vk" ("No" at Step S37 or "N"o at Step S41) is also executed if power storage unit 25 discharges the regenerative electric power and storage unit voltage Vc reaches lower limit voltage Vck. That is, power storage unit 25 discharges only if vehicle 1002 generates no regenerative electric power. Therefore, whenever storage unit voltage Vc becomes not higher than lower limit voltage Vck during the discharge of power storage unit 25, vehicle 1002 accelerates, travels at a constant speed, or travels at vehicle speed "v" lower than predetermined speed "vk". If vehicle speed "v" is lower than predetermined speed "vk", the determination at Step S38 results in "No". Moreover, if vehicle speed "v" is not lower than predetermined speed "vk", vehicle 1002 accelerates or travels at a constant speed, accelerator pedal 61 is possibly pedaled to open throttle 62, i.e., in an accelerator-on state. In other words, at the moment when storage unit voltage Vc just reaches lower limit voltage Vck, the vehicle is rarely in the accelerator-off state in which accelerator pedal 61 is not pedaled to close throttle 62. This is because a driver cannot realize that storage unit voltage Vc reaches lower limit voltage Vck. Even if the driver realizes that storage unit voltage Vc reaches lower limit voltage Vck, there is no advantage for the driver to give the accelerator-off state simultaneously to the moment at which of storage unit voltage Vc reaching lower limit voltage Vck. Consequently, at the moment when storage unit voltage Vc becomes not higher than lower limit voltage Vck, vehicle 1002 is substantially in an accelerator-on state in which the accelerator pedal is pedaled, and not in the accelerator-off state ("No" at Step S41). Then, if storage unit voltage Vc becomes not higher than lower limit voltage Vck, controller 29 controls DC/DC converter 23 to halt (Step S31), and then returns to the main routine (Step S31A).

On the other hand, if vehicle 1002 is in the accelerator-off state ("Yes" at Step S41), vehicle 1002 accelerates or travels at a constant speed and the driver does not pedal the accelerator pedal. In this case, immediately after that, the driver may pedal a brake pedal to decelerate the vehicle; therefore, controller 29 starts up DC/DC converter 23 to operate on standby. This operation can recover the regenerative electric power reliably and charge the power into power storage unit 25 whenever the driver pedals the accelerator pedal. An operation of in-vehicle power supply device 1001 at this moment will be described below.

When vehicle 1002 is in the accelerator-off state at Step S41 ("Yes" at Step S41), since storage unit voltage Vc is not higher than lower limit voltage Vck, controller 29 controls DC/DC converter 23 such that power storage unit 25 is not discharged. Moreover, at this moment, since it is not known whether or not the driver decreases vehicle 1002 clearly intentionally to pedal the brake pedal, controller 29 also controls DC/DC converter 23 such that power storage unit 25 is not charged. Although vehicle 1002 decreases gradually during inertial traveling, if the regenerative electric power is recovered and charged into power storage unit 25 in this state, the inertial travel distance becomes shorter, which results in a possible failure in improvement in fuel savings in total, depending on conditions including vehicle speed "v" and vehicle weight. Therefore, controller 29 controls DC/DC converter 23 such that power storage unit 25 is almost neither charged nor discharged, and causes DC/DC converter 23 to be on standby. Specifically, controller 29 reads the current value of storage unit voltage Vc, controls DC/DC converter 23 to hold the voltage value (Step S43), and then, returns to the main routine (Step S43A). This operation allows controller 29 to cause DC/DC converter 23 to operate. DC/DC converter 23 controls storage unit voltage Vc to remain unchanged at Step 43, but does not control load voltage Vf, i.e. the input-output voltage.

Upon returning to the main routine at Steps S19A, S29A, S31A, and S43A, controller 29 starts again to execute the subroutines shown in FIGS. 2A and 2B (Step S11A), and executes the subroutines repetitively. This operation allows controller 29 to perform switchover of DC/DC converter 23 among charging/discharging of power storage unit 25, halting, and standing-by, in accordance with storage unit voltage Vc and the state of vehicle 1002.

In the subroutines shown in FIGS. 2A and 2B, controller 29 causes DC/DC converter 23 to operate in the case that vehicle speed "v" is not lower than predetermined speed "vk" during no-deceleration of vehicle 1002 and vehicle 1002 is in the accelerator-off state, or in the case that storage unit voltage Vc is higher than lower limit voltage Vck and vehicle 1002 ends the deceleration. Storage unit voltage Vc corresponds to charging-status value SOC of power storage unit 25. Lower limit voltage Vck corresponds to lower limit value SOCk of charging-status value SOC. In this case, the operation of DC/DC converter 23 includes the standby operation at Step S43, that is, DC/DC converter 23 is not halted.

Conditions under which controller 29 causes DC/DC converter 23 to operate will be described below referring to the flowcharts shown in FIGS. 2A and 2B. In the case that vehicle speed "v" is not lower than predetermined speed "vk" during no-deceleration of vehicle 1002 and vehicle 1002 is in the accelerator-off state, the no-deceleration is the first condition; therefore, the determinations at Steps S17, S25, and S35 result in "No". When the determinations at Steps S17 and S25 result in "No", controller 29 controls DC/DC converter 23 to discharge power storage unit 25 (Step S19); thus, at this stage, controller 29 causes DC/DC converter 23 to operate. Therefore, when storage unit voltage Vc is not lower than lower limit voltage Vck, controller 29 causes DC/DC converter 23 to operate if vehicle 1002 is in the state of no-deceleration. On the other hand, controller 29 causes DC/DC converter 23 to operate on standby (Step S43) in the case that storage unit voltage Vc is not higher than lower limit voltage Vck, vehicle 1002 is in no-deceleration ("No" at Step S35), vehicle speed "v" is not lower than predetermined speed "vk" ("Yes" at Step S37), and vehicle 1002 is in the accelerator-off state ("Yes" at Step S41). Thus, during the no-deceleration of vehicle 1002, if vehicle speed "v" is not lower than predetermined speed "vk" and vehicle 1002 is in the accelerator-off state, controller 29 causes DC/DC converter 23 to operate.

On the other hand, when storage unit voltage Vc is higher than lower limit voltage Vck and vehicle 1002 ends the deceleration, the determinations at Steps S17 and S25 turn from "Yes" to "No". Accordingly, controller 29 causes DC/DC converter 23 to operate at Step S19 to discharge power storage unit 25.

If storage unit voltage Vc is lower than upper limit voltage Vcu and the regenerative electric power is generated, in other words, if vehicle 1002 decelerates ("Yes" at Step S25 or S35) and vehicle 1002 is in the fuel cut state (Yes at Step S27) with vehicle speed "v" being not lower than predetermined speed "vk", controller 29 causes DC/DC converter 23 to operate to charge power storage unit 25 at Step S29. Upper limit voltage Vcu corresponds to upper limit value SOCu of charging-status value SOC. At this moment, DC/DC converter 23 has already started up. The reason for this is as follows.

When storage unit voltage Vc ranges between upper limit voltage Vcu and lower limit voltage Vck, and when vehicle 1002 decelerates ("Yes" at Step S25), controller 29 causes DC/DC converter 23 to operate to charge the regenerative electric power into power storage unit 25. Accordingly, whenever storage unit voltage Vc ranges between upper limit voltage Vcu and lower limit voltage Vck and vehicle 1002 decelerates ("Yes" at Step S25), controller 29 causes DC/DC converter 23 to operate.

Next, when the determination at Step S35 results in "Yes", storage unit voltage Vc is not higher than lower limit voltage Vck and vehicle 1002 decelerates. Accordingly, DC/DC converter 23 is in a state immediately before starting charging power storage unit 25. In order to charge the regenerative electric power into power storage unit 25, vehicle 1002 is required to decelerate; therefore, the driver does not pedal accelerator pedal 61. After that, even if the driver pedals the brake pedal rapidity, when vehicle 1002 becomes in the accelerator-off state at Step S41 ("Yes" at Step S41) before the vehicle decelerates at Step S35 ("Yes" at Step S35), controller 29 causes DC/DC converter 23 to operate on standby at Step S43 since the speed of controller 29 is much faster than the speed at which the brake pedal is pedaled.

For this reason, whenever storage unit voltage Vc is lower than upper limit voltage Vcu and the regenerative electric power is generated, DC/DC converter 23 operates.

Figure 3:
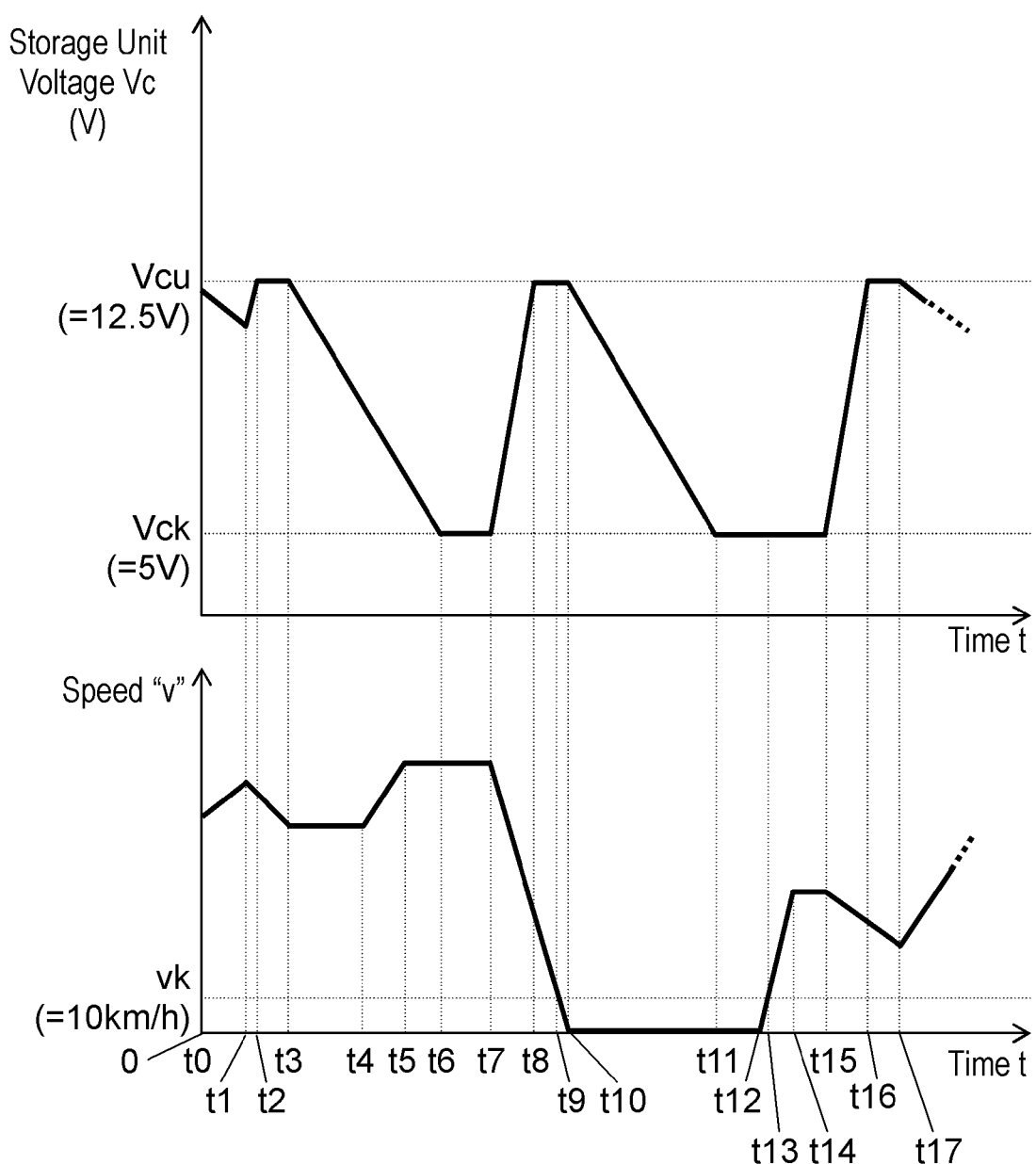
FIG. 3 is a graph showing variations with time of a voltage of a power storage unit to a vehicle of the in-vehicle power supply device according to Embodiment 1.

An operation of vehicle 1002 having in-vehicle power supply device 1001 installed therein will be described below. FIG. 3 is a graph showing variations with time in storage unit voltage Vc and vehicle speed "v". In each of the upper and lower graphs shown in FIG. 3, the horizontal axis represents time "t". In FIG. 3, the vertical axis of the upper graph represents storage unit voltage Vc, and the vertical axis of the lower graph represents vehicle speed "v". Here, vehicle 1002 has a function of no idling.

At time t0, vehicle 1002 accelerates, and storage unit voltage Vc is lower than upper limit voltage Vcu and is not lower than lower limit voltage Vck. Power storage unit 25 preserves the regenerative electric power stored during a preceding deceleration, and is capable of discharging the stored regenerative electric power. Accordingly, at time t0, since the determinations at Steps S13, S21, and S25 result in "No" in the flowcharts of FIGS. 2A and 2B, controller 29 controls DC/DC converter 23 at Step S19 such that load voltage Vf becomes equal to predetermined discharge voltage Vfd. This operation allows DC/DC converter 23 to discharge a part of the electric power stored in power storage unit 25 to main power supply 13, and to discharge the remaining power to load 19, accordingly decreasing storage unit voltage Vc with time.

After that, at time t1, the driver pedals the brake pedal to decelerate vehicle 1002, which causes electric generator 11 to generate the regenerative electric power. Vehicle speed "v" is higher than predetermined speed "vk" for the period from time t1 to time t3 during which vehicle 1002 decelerates. Therefore, at time t1, the determinations at Steps S13 and S21 result in "No" and the determinations at Steps S25 and S27 result "Yes" in the flowcharts of FIGS. 2A and 2B. Consequently, at Step S29, controller 29 controls DC/DC converter 23 such that load voltage Vf becomes equal to predetermined charge voltage Vfc, that is, the controller controls DC/DC converter 23 to charge the regenerative electric power into power storage unit 25, accordingly increasing storage unit voltage Vc.

After that, storage unit voltage Vc starting increasing at time t1 reaches upper limit voltage Vcu at time t2, and becomes not lower than upper limit voltage Vcu. At time t2, the determinations at Steps S13 and S17 result in "Yes" in the flowcharts of FIGS. 2A and 2B; therefore, controller 29 causes DC/DC converter 23 to halt at Step S31. At time t2, power storage unit 25 is no longer charged with the regenerative electric power and the vehicle decelerates; therefore, power storage unit 25 is not discharged as well. Accordingly, controller 29 causes DC/DC converter 23 to halt in order to reduce unnecessary power consumption of DC/DC converter 23.

At time t3, the driver shifts vehicle 1002 from the deceleration into constant-speed travelling. At this moment, storage unit voltage Vc is equal to upper limit voltage Vcu. Therefore, the determination at Step S13 results in "Yes" and the determination at Step S17 results in "No" in the flowcharts of FIGS. 2A and 2B; therefore, controller 29 controls DC/DC converter 23 at Step S19 such that load voltage Vf becomes equal to predetermined discharge voltage Vfd. As a result, controller 29 controls DC/DC converter 23 to discharge the regenerative electric power stored in power storage unit 25 mainly to load 19. That is, at the time (time t3) when the deceleration of vehicle 1002 ends, controller 29 starts up DC/DC converter 23 which has halted at time t2. This operation allows storage unit voltage Vc to decreases with time from time t3. Thus, storage unit voltage Vc that has reached upper limit voltage Vcu decreases rapidly, and power storage unit 25 discharges rapidly. This enables power storage unit 25 to recover the regenerative electric power to be generated next time rapidly, and to charge the recovered power into power storage unit 25.

At time t4, the driver shifts vehicle 1002 from the constant-speed travelling into acceleration. Storage unit voltage Vc at this moment ranges between upper limit voltage Vcu and lower limit voltage Vck. Therefore, since the determinations at Steps S13, S21, and S25 result in "No" in the flowcharts of FIGS. 2A and 2B, controller 29 controls DC/DC converter 23 at Step S19 such that load voltage Vf becomes equal to predetermined discharge voltage Vfd. As a result, controller 29 continues the operation in which the regenerative electric power stored in power storage unit 25 is discharged mainly to load 19, accordingly decreasing storage unit voltage Vc with time.

At time t5, the driver shifts vehicle 1002 from the acceleration into constant-speed travelling. At this moment, storage unit voltage Vc ranges between upper limit voltage Vcu and lower limit voltage Vck. Therefore, at time t5 as in the case at time t4, since the determinations at Steps S13, S21, and S25 result in "No" in the flowcharts of FIGS. 2A and 2B, controller 29 controls DC/DC converter 23 at Step S19 such that load voltage Vf becomes equal to predetermined discharge voltage Vfd. As a result, controller 29 further continues the operation in which the regenerative electric power stored in power storage unit 25 is discharged mainly to load 19, accordingly decreasing storage unit voltage Vc with time.

At time t6, although vehicle 1002 still continues the constant-speed travelling, storage unit voltage Vc reaches lower limit voltage Vck to become not higher than lower limit voltage Vck. Accordingly, at time t6, in the flowcharts of FIGS. 2A and 2B, the determination at Step S13 result in "No", the determination at Step S21 results in "Yes", the determination at Step S35 results in "No", the determination at Step S37 results in "Yes", and the determination at Step S41 results in "No". This operation at Step S31 allows controller 29 to control DC/DC converter 23 to halt such that the charging to power storage unit 25 is halted. At time t6, power storage unit 25 can be no longer discharged, the regenerative electric power is not generated due to the constant-speed travelling, and power storage unit 25 is not charged. Hence, controller 29 causes DC/DC converter 23 to halt in order to reduce unnecessary power consumption of DC/DC converter 23.

At time t7, the driver pedals the brake pedal to starts decelerating vehicle 1002. As a result, since the regenerative electric power begins to be generated, controller 29 controls DC/DC converter 23 to charge the regenerative electric power into power storage unit 25. Controller 29 causes DC/DC converter 23 to halt from time t5 to immediately before time t7. Then, in order to charge the regenerative electric power into power storage unit 25 securely, controller 29 controls DC/DC converter 23 at time t7 as follows.

First, vehicle 1002 starts decelerating at time t7, which means that the driver changes the pedal from the accelerator pedal to the brake pedal immediately before time t7. At this moment, the driver has a foot removed off the accelerator pedal for accelerator-off, but yet to pedal the brake pedal; therefore, the deceleration is not started. Therefore, in the flowcharts of FIGS. 2A and 2B, the determination at Step S13 results in "No", the determination at Step S21 results in "Yes", the determination at Step S35 results in "No", the determination at Step S37 results in "Yes", and the determination at Step S41 results in "Yes". Then, at Step 43, controller 29 reads the current value of storage unit voltage Vc, and controls DC/DC converter 23 to maintain the value. That is, controller 29 controls DC/DC converter 23 such that the current value of storage unit voltage Vc (equal to lower limit voltage Vck) remains unchanged. Accordingly, although electric current does not flow through DC/DC converter 23, DC/DC converter 23 completes its start-up and operates on standby.

After that, the driver pedals the brake pedal to start decelerating vehicle 1002. At this moment, since the regenerative electric power is not charged into power storage unit 25, the determination at Step S13 results in "No", the determination at Step S21 results in "Yes", the determination at Step S35 results in "Yes", and the determination at Step S27 results in "Yes" in the flowcharts of FIGS. 2A and 2B. Therefore, controller 29 controls DC/DC converter 23 at Step S29 such that load voltage Vf becomes equal to predetermined charge voltage Vfc. This operation allows DC/DC converter 23 having already started up to charge the regenerative electric power into power storage unit 25 without fail.

These operations after time t7 increases storage unit voltage Vc with time, and allows the regenerative electric power to be charged into power storage unit 25. Moreover, vehicle speed "v" decreases with time since the vehicle decelerates.

At time t8, although vehicle 1002 decelerates, storage unit voltage Vc reaches upper limit voltage Vcu to become not lower than upper limit voltage Vcu. Therefore, in the flowcharts of FIGS. 2A and 2B, since the determinations at Steps S13 and S17 result in "Yes", controller 29 controls DC/DC converter 23 to halt at Step S31 such that the charging to power storage unit 25 is halted. This is because power storage unit 25 can no longer be charged and power storage unit 25 is not discharged due to the deceleration. Consequently, controller 29 causes DC/DC converter 23 to halt in order to reduce unnecessary power consumed by DC/DC converter 23.

At time t9, vehicle speed "v" of vehicle 1002 that decelerates reaches predetermined speed "vk" to become lower than predetermined speed "vk". However, since storage unit voltage Vc is equal to limit voltage Vcu at this moment, the determinations at Steps S13 and S17 result in "Yes" in the flowcharts of FIGS. 2A and 2B, and DC/DC converter 23 still halts subsequently at Step S31.

At time t10, vehicle speed "v" becomes equal to 0 (zero) km/h, vehicle 1002 stops, and vehicle control circuit 31 starts performing no idling to halt engine 15A. Then, controller 29 controls DC/DC converter 23 to supply the regenerative electric power stored in power storage unit 25 mainly to load 19. That is, at time t10 as in the case at time t3 in the flowcharts of FIGS. 2A and 2B, the determination at Step S13 results in "Yes", the determination at Step S17 results in "No", and controller 29 controls DC/DC converter 23 at Step S19 such that load voltage Vf becomes equal to predetermined discharge voltage Vfd. As a result, during the no idling, the regenerative electric power stored in power storage unit 25 is supplied to load 19 rather than to main power supply 13. Moreover, since power storage unit 25 is discharged at predetermined discharge voltage Vfd (15 V) higher than the open-circuit voltage (=12 V) of main power supply 13, a part of the regenerative electric power stored in power storage unit 25 is supplied also to main power supply 13.

At time t11, although vehicle speed "v" remains to be 0 (zero) km/h and the no idling is continued, storage unit voltage Vc reaches lower limit voltage Vck to become not higher than lower limit voltage Vck. Consequently, in the flowcharts of FIGS. 2A and 2B, the determination at Step S13 results in "No", the determination at Step S21 results in "Yes", the determination at Step S35 results in "No", and the determination at Step S37 results in "No". Accordingly, controller 29 causes DC/DC converter 23 to halt at Step S31. That is, since storage unit voltage Vc reaches lower limit voltage Vck and becomes not higher than lower limit voltage Vck, power storage unit 25 can be no longer discharged. Concurrently, no regenerative electric power is generated due to vehicle 1002 which stops, resulting in no charging of power storage unit 25 as well. Therefore, controller 29 causes DC/DC converter 23 to halt in order to reduce unnecessary power consumed in DC/DC converter 23. Since the discharge from power storage unit 25 is halted at time t11, main power supply 13 supplies electric power to load 19 after time t11 in the state of no idling.

At time t12, the driver changes the pedal to be depressed from the brake pedal to accelerator pedal 61 to start accelerating vehicle 1002. At this moment, vehicle control circuit 31 detects the changing of the pedal to be depressed from the brake pedal to accelerator pedal 61, and drives starter 15 to start up engine 15A, hence ending the no idling. These operations increase vehicle speed "v" as shown in FIG. 3. However, at time t11, since storage unit voltage Vc reaches lower limit voltage Vck, power storage unit 25 cannot be discharged. Moreover, at time t12, power storage unit 25 cannot be charged since vehicle 1002 accelerates and no regenerative electric power is generated. Furthermore, at time t12, vehicle speed "v" is lower than predetermined speed "vk". Consequently, in the flowcharts of FIGS. 2A and 2B, the determination at Step S13 results in "No", the determination at Step S21 results in "Yes", the determination at Step S35 results in "No", and the determination at Step S37 results in "No". Therefore, controller 29 continues to halt DC/DC converter 23 at Step S31.

At time t13, as shown in FIG. 3, vehicle speed "v" becomes higher to reach predetermined speed "vk", and the acceleration is continued. At this moment, as shown in FIG. 3, since storage unit voltage Vc remains equal to lower limit voltage Vck and no regenerative electric power is generated, power storage unit 25 can be neither charged nor discharged, as in the case at time t12. Moreover, since the accelerator pedal remains pedaled, in the flowcharts of FIGS. 2A and 2B, the determination at Step S13 results in "No", the determination at Step S21 results in "Yes", the determination at Step S35 results in "No", the determination at Step S37 results in "Yes", and the determination at Step S41 results in "No". Consequently, controller 29 continues to halt DC/DC converter 23 at Step S31.

At time t14, vehicle speed "v" becomes constant and the driver causes vehicle 1002 to travel at a constant speed. At this moment, since storage unit voltage Vc remains equal to lower limit voltage Vck and no regenerative electric power is generated, power storage unit 25 can be neither charged nor discharged, as in the case at time t13. Moreover, the accelerator pedal remains pedaled for the constant-speed travelling, and is not in the accelerator-off state. Accordingly, in the flowcharts of FIGS. 2A and 2B, the determination at Step S13 results in "No", the determination at Step S21 results in "Yes", the determination at Step S35 results in "No", the determination at Step S37 results in "Yes", and the determination at Step S41 results in "No". This is the same state as that at time t13. Consequently, controller 29 continues to halt DC/DC converter 23 at Step S31.

At time t15, the driver changes the pedal to be depressed from accelerator pedal 61 to the brake pedal to decelerate vehicle 1002. At this moment, similarly to time t7, when the driver has a foot removed from accelerator pedal 61 and the vehicle becomes in the accelerator-off state controller 29 reads the current value of storage unit voltage Vc at Step S43, controls DC/DC converter 23 to hold the voltage value, and causes DC/DC converter 23 to operate on standby. Then, when vehicle 1002 starts decelerating upon pedaling the brake pedal, controller 29 controls DC/DC converter 23 at Step S29 such that load voltage Vf becomes equal to predetermined charge voltage Vfc, and controls DC/DC converter 23 to charge the regenerative electric power generated by the deceleration into power storage unit 25. As a result, storage unit voltage Vc rises with time.

At time t16, although vehicle speed "v" continues to decrease and vehicle 1002 decelerates, storage unit voltage Vc reaches upper limit voltage Vcu to becomes not lower than upper limit voltage Vcu. At this moment, similarly to time t8, since the determinations at Steps S13 and S17 result in "Yes" in the flowcharts of FIGS. 2A and 2B, controller 29 controls DC/DC converter 23 to halt at Step S31 such that the charging to power storage unit 25 is halted. This is because power storage unit 25 can no longer be charged or discharged due to the deceleration. Consequently, controller 29 causes DC/DC converter 23 to halt in order to reduce unnecessary power consumed in DC/DC converter 23.

At time t17, vehicle speed "v" starts increasing and vehicle 1002 starts accelerating again. This operation allows controller 29 to control DC/DC converter 23 to discharge, mainly to load 19, the regenerative electric power that has been stored in power storage unit 25 by time t16. Specifically, in the flowcharts of FIGS. 2A and 2B, since the determination at Step S13 results in "Yes" and the determination at Step S17 results in "No", controller 29 controls DC/DC converter 23 at Step S19 such that load voltage Vf becomes equal to predetermined discharge voltage Vfd. This is the same operation as that at time t3 at which DC/DC converter 23 is started up upon ending of the deceleration of vehicle 1002. This allows an effective utilization of the regenerative electric power.

Since the state after time t17 is the same as that after time t0, a higher efficiency of vehicle 1002 can be achieved from then on, by repeating any one of the operations described above in accordance with the status.

The configuration and operations described above reduce unnecessary power consumed in DC/DC converter 23. Moreover, the start-up of DC/DC converter 23 prior to the generation of the regenerative electric power reduces the possibility of failed recovery of the regenerative electric power that is abruptly generated immediately after starting the deceleration. This allows the recovery efficiency to be retained. This configuration provides in-vehicle power supply device 1001 with high efficiency of vehicle 1002 in total.

In conventional in-vehicle power supply device 501 shown in FIG. 7, DC/DC converter 141 may be controlled to halt while the device operates only to hold the voltage of electric double-layer capacitor 143. In this case, even if DC/DC converter 141 is started up to operate after the regenerative electric power begins to be generated, the regenerative electric power may not be recovered until the start-up is completed. In particular, unless the regenerative electric power that is abruptly generated immediately after starting the deceleration via braking is able to be recovered, the recovery efficiency of the regenerative electric power decreases.

In in-vehicle power supply device 1001 according to Embodiment 1, when storage unit voltage Vc is either not lower than upper limit voltage Vcu or not higher than lower limit voltage Vck, controller 29 causes DC/DC converter 23 to halt. However, even in the case that the condition for halting is fulfilled, if the condition for causing DC/DC converter 23 to operate is fulfilled concurrently with the case, controller 29 places a higher priority to the condition for causing DC/DC converter 23 to operate. The condition for causing DC/DC converter 23 to operate is any one of cases: (1) that vehicle speed "v" is not lower than predetermined speed "vk" and engine 15A of vehicle 1002 is in the accelerator-off state during no-deceleration of vehicle 1002; and (2) that storage unit voltage Vc (corresponding to charging-status value SOC) is higher than lower limit voltage Vck (corresponding to lower limit value SOCk) and the deceleration of vehicle 1002 ends. This configuration allows controller 29 to provide a higher priority to the start-up of DC/DC converter 23 than to the halt of DC/DC converter 23. The operation of controller 29 is not limited to these conditions, but controller 29 may immediately operate to cause DC/DC converter 23 to halt either when storage unit voltage Vc rises to reach upper limit voltage Vcu ("Yes" at Step S13) or when storage unit voltage Vc decreases to reach lower limit voltage Vck ("Yes" at Step S21) in the flowcharts of FIGS. 2A and 2B. In this case, DC/DC converter 23 can be halted during a period as long as possible. However, if the condition described above for starting up DC/DC converter 23 is fulfilled immediately after that, DC/DC converter 23 starts up immediately after the halting. This requires a period for completing the start-up. In in-vehicle power supply device 1001 according to Embodiment 1, even in the case that the condition for halting DC/DC converter 23 is fulfilled (for example, even in the case that charging-status value SOC is not larger than predetermined lower limit value SOCk), controller 29 causes DC/DC converter 23 to operate without a halt if the condition for starting up is fulfilled concurrently with the condition for halting, In in-vehicle power supply device 1001 according to Embodiment 1, if storage unit voltage Vc is not lower than upper limit voltage Vcu or not higher than lower limit voltage Vck, controller 29 causes DC/DC converter 23 to halt. If storage unit voltage Vc is not lower than upper limit voltage Vcu, controller 29 may control DC/DC converter 23 not to halt, but to operate such that DC/DC converter 23 holds storage unit voltage Vc. The reason of this is as follows. When storage unit voltage Vc rises to reach upper limit voltage Vcu and DC/DC converter 23 halts, storage unit voltage Vc gradually decreases due to an internal resistance of power storage unit 25. As a result, the stored regenerative electric power is wastefully consumed by the internal resistance of power storage unit 25, which shortens the period during which the regenerative electric power is supplied to load 19. Hence, if storage unit voltage Vc is not lower than upper limit voltage Vcu, controller 29 may cause DC/DC converter 23 to operate to hold storage unit voltage Vc. However, if the internal resistance is so small that storage unit voltage Vc may not decrease substantially, controller 29 may cause DC/DC converter 23 to halt so as to reduce the power consumption of the converter to improve efficiency. Therefore, in consideration of the internal resistance of power storage unit 25 and the period for halting DC/DC converter 23 during the use of vehicle 1002, it may be determined to take any of the operations of DC/DC converter 23, i.e. the halt or the continuous operation thereof, when storage unit voltage Vc is not lower than upper limit voltage Vcu. For this reason, when storage unit voltage Vc (corresponding to charging-status value SOC) reaches at least lower limit voltage Vck (corresponding to lower limit value SOCk), controller 29 causes DC/DC converter 23 to halt.

In in-vehicle power supply device 1001 according to Embodiment 1, controller 29 starts up DC/DC converter 23 if vehicle speed "v" is not lower than predetermined speed "vk" during no-deceleration of vehicle 1002 and vehicle 1002 is in the accelerator-off state. This operation, however, is not limited to the condition of vehicle 1002 being in the no-deceleration. That is, in FIGS. 2A and 2B, the no-deceleration of vehicle 1002, as the first condition, corresponds to the determinations of "No" at Steps S17, S25, and S35. In these cases, controller 29 causes DC/DC converter 23 to operate. In contrast to the above, an operation of in-vehicle power supply device 1001 for the determinations at Steps S17, S25, and S35 resulting in "Yes" Will be described below If the determination at Step S17 results in "Yes", controller 29 causes DC/DC converter 23 to halt at Step S31. However, as described above, if storage unit voltage Vc is not lower than upper limit voltage Vcu at Step S13 (Yes at Step S13), controller 29 does not necessarily halt DC/DC converter 23, but may operate to hold storage unit voltage Vc. In this case, DC/DC converter 23 operates.

In the case that the determinations at Steps S25 and S35 result in "Yes", if vehicle speed "v" is not lower than predetermined speed "vk" at Step S27 (Yes at Step S27), controller 29 controls DC/DC converter 23 at Step S29 such that load voltage Vf becomes equal to predetermined charge voltage Vfc. That is, DC/DC converter 23 operates.

For these reasons, the condition for DC/DC converter 23 to operate is not limited to the no-deceleration of vehicle 1002.

In in-vehicle power supply device 1001 according to Embodiment 1, one of the conditions under which DC/DC converter 23 operates is that vehicle 1002 is in the accelerator-off state; however, the condition is not limited to the accelerator-off state. That is, the status of accelerator pedal 61 is determined from an accelerator position signal indicating the accelerator position while the signal is contained in data signal Sdata sent from vehicle control circuit 31. According to Embodiment 1, the accelerator-off state is determined from the accelerator position signal when the driver has a foot removed from accelerator pedal 61. However, even in the status that the driver has the foot placed on accelerator pedal 61, there is a region where vehicle control circuit 31 determines that accelerator pedal 61 is not pedaled. In addition, such an allowance of accelerator pedal 61 may cause an error. Even in these cases, controller 29 can cause DC/DC converter 23 to operate on standby frequently by performing the same operation as that for the accelerator-off state. This decreases in the possibility of failed recovery of the regenerative electric power.

For these reasons, if the accelerator position is not larger than a predetermined accelerator position as well as in the accelerator-off state, controller 29 may determine that the determination at Step S41 of FIGS. 2A and 2B results in "Yes". In this case, the predetermined accelerator position has been previously stored in controller 29, with the predetermined accelerator position determined previously in such a manner that: in the accelerator position signal, the predetermined accelerator position is determined as the position equivalent to the accelerator-off state, the state of which involves both the error due to the allowance and the region where the depression of accelerator pedal 61 is ignored as described above. Moreover, the accelerator position is not limited to the configuration in which the accelerator position is determined from the accelerator position signal, but the accelerator position may be determined from a throttle position signal which is obtained in accordance with the accelerator position signal.

Exemplary Embodiment 2

Figure 4:
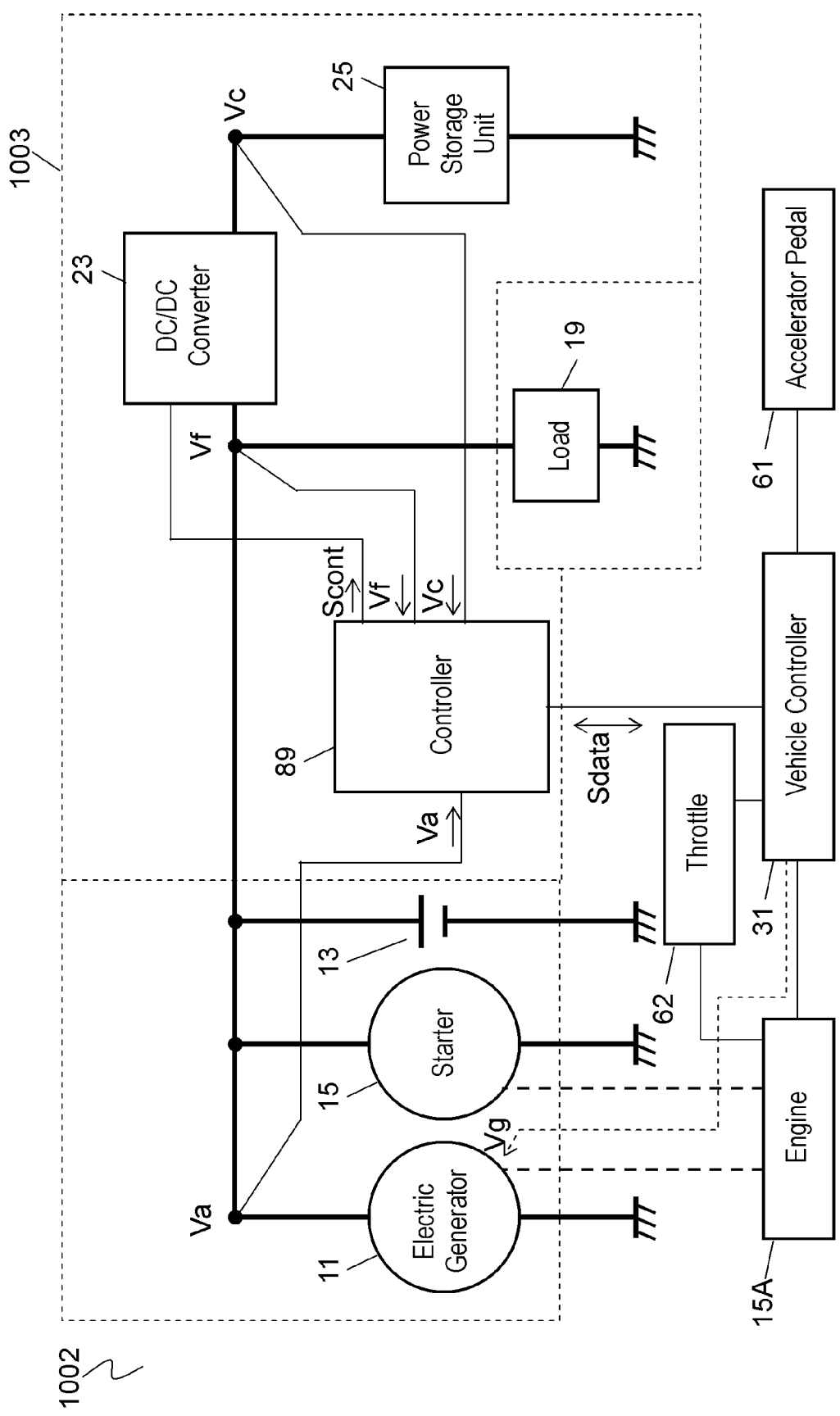
FIG. 4 is a block circuit diagram of an in-vehicle power supply device according to Exemplary Embodiment 2 of the invention.
Figure 5A:
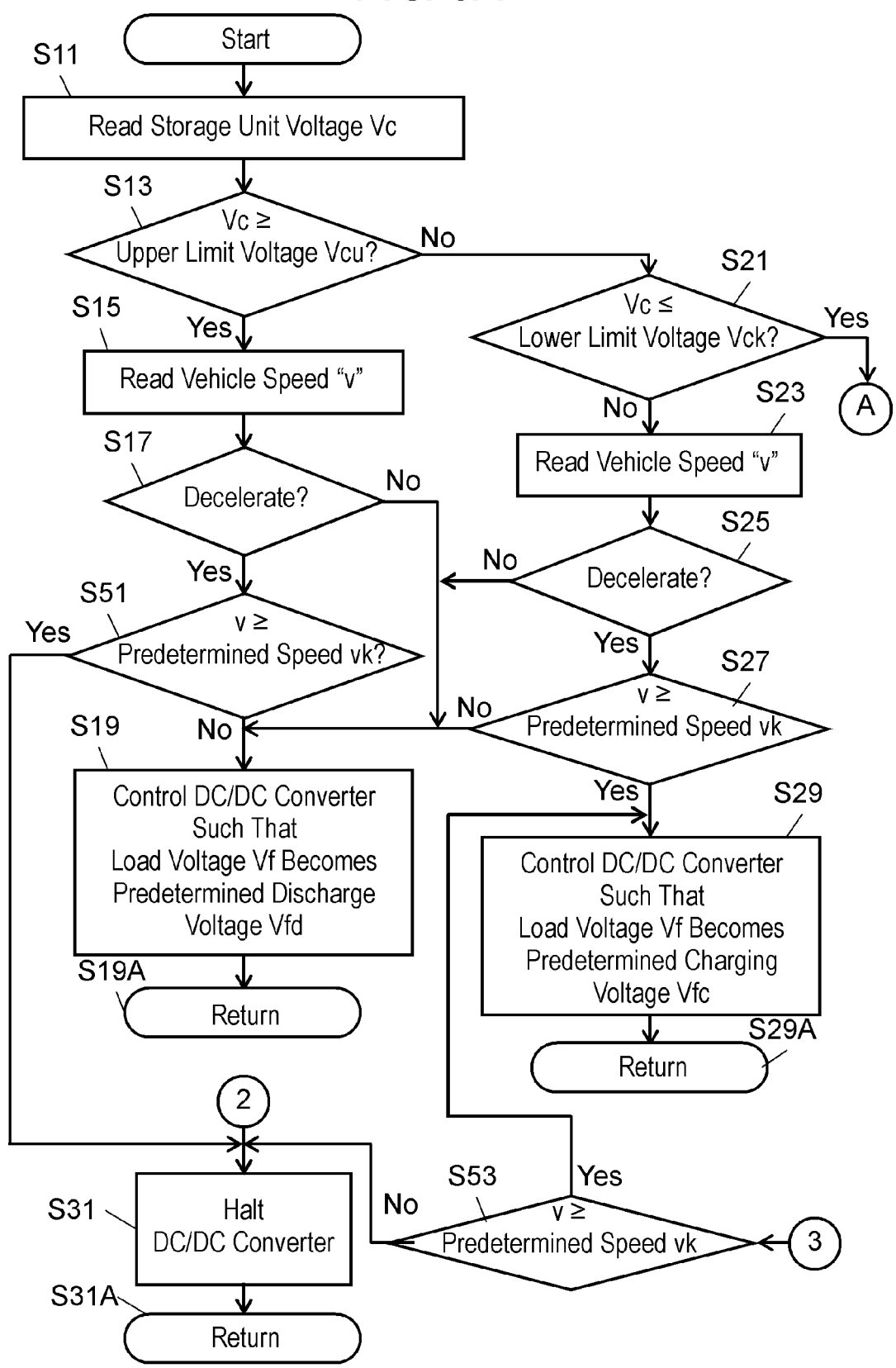
FIG. 5A is a flowchart illustrating an operation of the in-vehicle power supply device according to Embodiment 2.
Figure 5B:
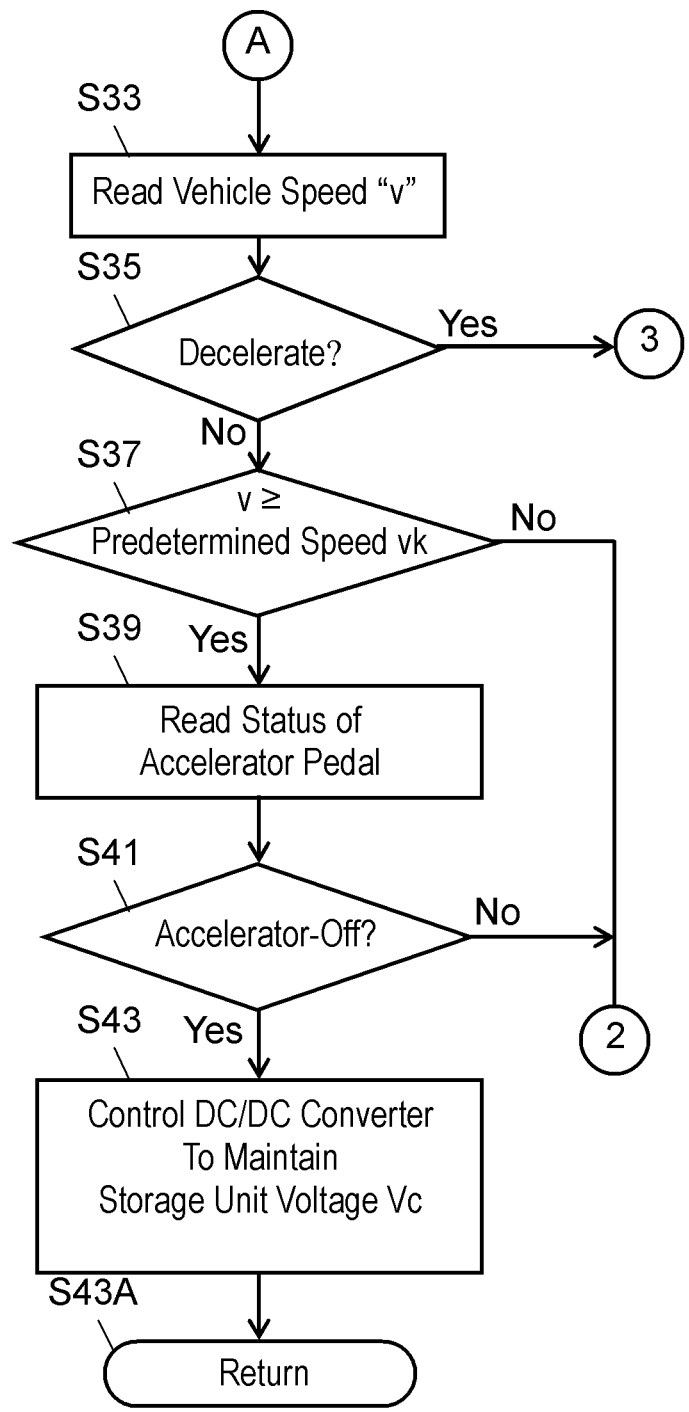
FIG. 5B is a flowchart illustrating an operation of the in-vehicle power supply device according to Embodiment 2.

FIG. 4 is a block circuit diagram of in-vehicle power supply device 1003 for use in a vehicle according to Exemplary Embodiment 2. FIGS. 5A and 5B are flowcharts illustrating operations of in-vehicle power supply device 1003. In FIGS. 4, 5A, and 5B, components having functions identical to those of in-vehicle power supply device 1001 according to Embodiment 1 shown in FIGS. 1, 2A, and 2B are denoted by the same reference numerals. In-vehicle power supply device 1003 according to Embodiment 2 includes controller 89 instead of controller 29 of in-vehicle power supply device 1001 shown in FIG. 1. In in-vehicle power supply device 1003 according to Embodiment 2, controller 89 causes DC/DC converter 23 to operate in the case that charging-status value SOC (storage unit voltage Vc) is larger than lower limit value SOCk (lower limit voltage Vck) and vehicle speed "v" is lower than predetermined speed "vk" when vehicle 1002 decelerates. An operation of in-vehicle power supply device 1003 will be detailed below with referring to FIGS. 5A and 5B.

If storage unit voltage Vc is higher than lower limit voltage Vck ("Yes" at Step S13 or "No" at Step S21), power storage unit 25 has stored the regenerative electric power.

In the case that storage unit voltage Vc is not lower than upper limit voltage Vcu at Step S13 ("Yes" at Step S13), if vehicle 1002 decelerates ("Yes" at Step S17), controller 89 compares vehicle speed "v" with predetermined speed "vk" (Step S51). If vehicle speed "v" is not lower than predetermined speed "vk" at Step S51 ("Yes" at Step S51), power storage unit 25 has already been fully charged in spite of the deceleration; therefore, controller 89 controls DC/DC converter 23 to halt at Step S31 such that power storage unit 25 is no longer charged. The operation is the same as that of Embodiment 1.

On the other hand, if vehicle speed "v" is lower than predetermined speed "vk" at Step S51 ("No" at Step S51), the vehicle decelerates and vehicle speed "v" is low; therefore, vehicle 1002 is to stop. In this case, controller 29 according to Embodiment 1 causes DC/DC converter 23 to halt; however, controller 89 according to Embodiment 2 causes DC/DC converter 23 to operate to discharge power storage unit 25 at Step S19. This operation allows power storage unit 25 to be discharged if vehicle 1002 is about to stop. As a result, the regenerative electric power stored in power storage unit 25 can be discharged as early as possible; therefore, the regenerative electric power to be subsequently generated can be recovered accordingly as much as possible, and stored into power storage unit 25.

Also in the case that storage unit voltage Vc ranges between upper limit voltage Vcu and lower limit voltage Vck at Step S21 ("No" at Step S21), if the vehicle decelerates ("Yes" at Step S25), controller 89 compares vehicle speed "v" with predetermined speed "vk" (Step S27). If vehicle speed "v" is not lower than predetermined speed "vk" at Step S27 ("Yes" at Step S27), controller 89 causes DC/DC converter 23 to operate at Step S29 to charge power storage unit 25 with the regenerative electric power, similarly to controller 29 according to Embodiment 1.

On the other hand, if vehicle speed "v" is lower than predetermined speed "vk" at Step S27 ("No" at Step S27), the vehicle decelerates and vehicle speed "v" is low; therefore, vehicle 1002 is about to stop. Accordingly, also in this case, power storage unit 25 is discharged as much as possible, and can recover a large amount of the regenerative electric power subsequently generated accordingly.

In in-vehicle power supply device 1001 according to Embodiment 1, if storage unit voltage Vc is higher than lower limit voltage Vck and vehicle speed "v" is lower than predetermined speed "vk" during deceleration, controller 29 causes DC/DC converter 23 to halt at Step S31. In contrast, in in-vehicle power supply device 1003 according to Embodiment 2, if storage unit voltage Vc is higher than lower limit voltage Vck and vehicle speed "v" is lower than predetermined speed "vk" during deceleration, controller 89 causes DC/DC converter 23 to operate to discharge power storage unit 25 at Step S19. Therefore, under the condition described above, DC/DC converter 23 may either operate or halt. However, in in-vehicle power supply device 1003 according to Embodiment 1, the operation of causing DC/DC converter 23 to operate to discharge power storage unit 25 can provide an advantage that a larger amount of the regenerative electric power is recovered, no matter to how small, than that of in-vehicle power supply device 1001 according to Embodiment 1.

In in-vehicle power supply device 1001 according to Embodiment 1, if storage unit voltage Vc is not higher than lower limit voltage Vck and the vehicle decelerates ("Yes" at Step S35), controller 29 compares vehicle speed "v" with predetermined speed "vk" at Step S27. However, in in-vehicle power supply device 1003 according to Embodiment 2, if vehicle speed "v" is lower than predetermined speed "vk" at Step S27 ("No" at Step S27), power storage unit 25 is then discharged at Step S19 in spite of the fact that storage unit voltage Vc is not higher than lower limit voltage Vck. In order to avoid this defect, in in-vehicle power supply device 1003 according to Embodiment 2, if vehicle 1002 decelerates at Step S35 ("Yes" at Step S35), controller 89 compares vehicle speed "v" with predetermined speed "vk" at Step S53. If vehicle speed "v" is not lower than predetermined speed "vk" ("Yes" at Step S53), controller 89 causes DC/DC converter 23 to operate at Step S29 to charge power storage unit 25 with the regenerative electric power, similarly to Embodiment 1. On the other hand, if vehicle speed "v" is lower than predetermined speed "vk" at Step S53 ("No" at Step S53), controller 89 causes DC/DC converter 23 to halt at Step S31 in order to perform the same operation as Embodiment 1. This operation can prevent power storage unit 25 having storage unit voltage Vc not higher than lower limit voltage Vck, from being further discharged, and can halt the unnecessary operation of DC/DC converter 23.

In in-vehicle power supply device 1003 according to Embodiment 2, the operations other than those described above are the same as those of Embodiment 1.

The configuration and operation describe above can reduce the unnecessary power consumed in DC/DC converter 23, and store the regenerative electric power, which is abruptly generated immediately after starting the deceleration, into power storage unit 25 without fail by starting up DC/DC converter 23 prior to the generation of the regenerative electric power. This operation maintains the recovery efficiency. Moreover, by discharging power storage unit 25 as early as possible, the regenerative electric power to be subsequently generated can be recovered as much as possible accordingly. This allows in-vehicle power supply device 1003 to improve the total efficiency of vehicle 1002.

In in-vehicle power supply devices 1001 and 1003 according to Embodiments 1 and 2, if vehicle speed "v" is not lower than predetermined speed "vk" during no-deceleration of vehicle 1002 and the vehicle is in the accelerator-off state, controllers 29 and 89 cause DC/DC converter 23 to operate on standby such that, upon starting the deceleration of vehicle 1002, DC/DC converter 23 operates to charge power storage unit 25 with the regenerative electric power. In in-vehicle power supply devices 1001 and 1003 according to Embodiments 1 and 2, controllers 29 and 89 may cause DC/DC converter 23 not to operate on standby, but may control DC/DC converter 23 such that: if vehicle speed "v" is not lower than predetermined speed "vk" during no-deceleration of vehicle 1002 and the vehicle is in the accelerator-off state, DC/DC converter 23 operates to charge power storage unit 25 with the electric power fed from electric generator 11. This operation, in the case that the driver changes the pedal to be depressed from accelerator pedal 61 to the brake pedal very quickly, a possible failure in recovering the regenerative electric power that is generated during the pedal changing can be avoided. However, with this configuration, even if the driver changes the pedal relatively slowly from accelerator pedal 61 to the brake pedal, in other words, even if the brake pedal is not pedaled and vehicle 1002 still decelerates gradually during inertial traveling, DC/DC converter 23 charges power storage unit 25 with the electric power. Since the electric power being charged is supplied from electric generator 11 via DC/DC converter 23 during the inertial traveling of vehicle 1002, the amount of the electric power generated by electric generator 11 increases accordingly, providing engine 15A with an additional mechanical load. As a result, the inertial travel distance becomes shorter, deteriorating fuel savings depending on the circumstances. Consequently, the operation of each of controllers 29 and 89 can be selected between two ways, i.e. causing DC/DC converter 23 to operate on standby and causing DC/DC converter 23 not to operate on standby. The selection is made based on the primary importance which is put on either the improved fuel savings via the elongated inertial travel distance, or the reduced failure in recovering the regenerative electric power that is generated during the driver's very-quick changing from accelerator pedal 61 to the brake pedal.

Moreover, in order to cause DC/DC converter 23 to operate on standby, controllers 29 and 89 control DC/DC converter 23 to hold the current value of such that storage unit voltage Vc. In order to cause DC/DC converter 23 to operate on standby, controllers 29 and 89 may control DC/DC converter 23 such that load voltage Vf becomes equal to electric generator voltage Va. That is, if load voltage Vf is approximately equal to electric generator voltage Va, no electric current flows between the input and output of DC/DC converter 23; therefore, DC/DC converter 23 can operate on standby almost without charging and discharging of power storage unit 25. However, unnecessary charging and discharging of power storage unit 25 may occur due to variations in electric generator voltage Va and variations in load voltage Vf caused by variations in power consumption of load 19. Therefore, controllers 29 and 89 preferably control DC/DC converter 23 to operate on standby to make storage unit voltage Vc stable. Moreover, controllers 29 and 89 may control DC/DC converter 23 to hold storage unit voltage Vc to prevent power storage unit 25 from over-discharge.

Figure 6:
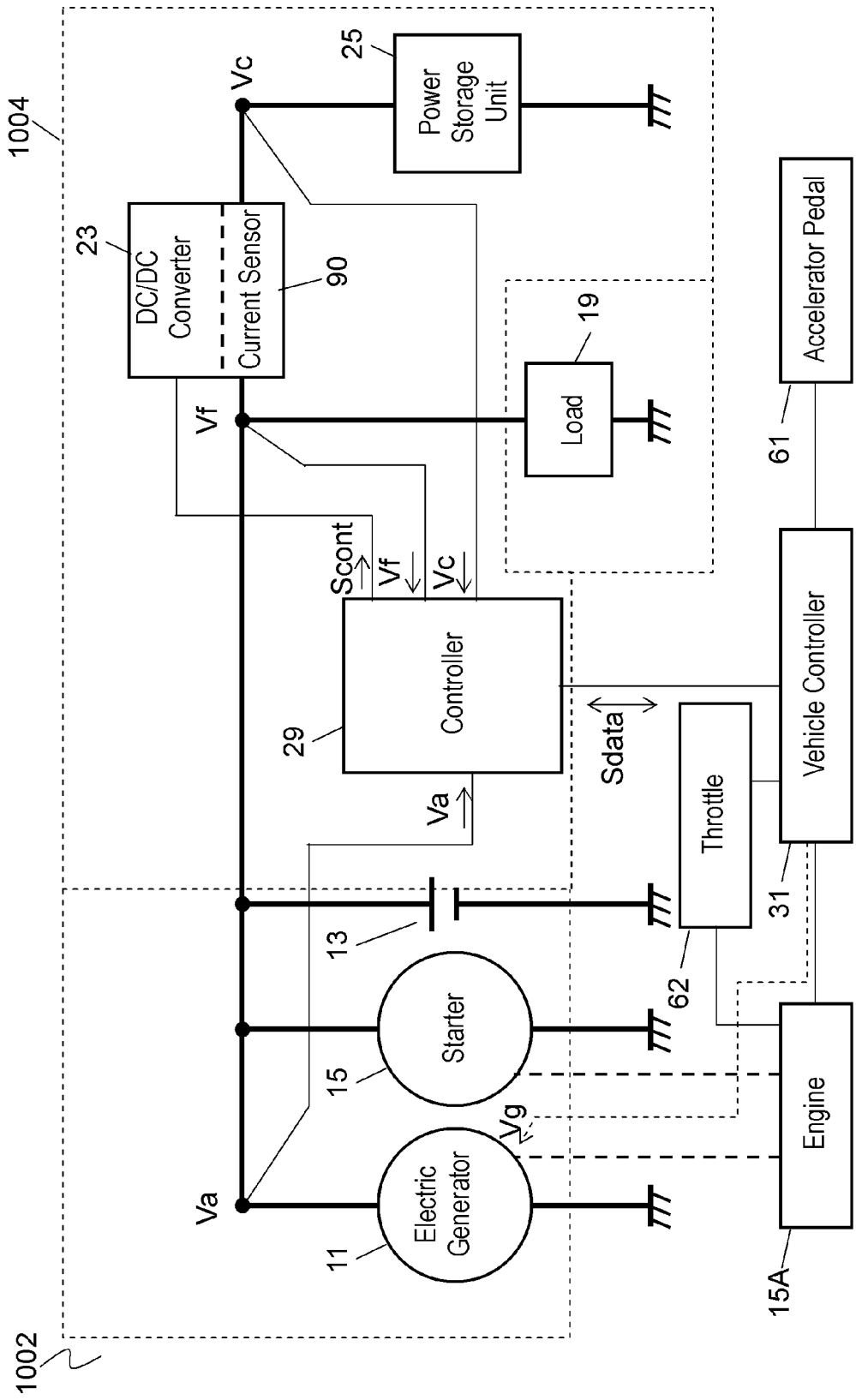
FIG. 6 is a block circuit diagram of another in-vehicle power supply device according to Embodiment 2.

FIG. 6 is a block circuit diagram of another in-vehicle power supply device 1004 according to Embodiment 2. In FIG. 6, components identical to those of in-vehicle power supply device 1001 shown in FIG. 1 are denoted by the same reference numerals. In-vehicle power supply device 1004 further includes current sensor 90 that detects an electric current which flows between the input and output of DC/DC converter 23. Controllers 29 and 89 may control DC/DC converter 23 such that no electric current flows between the input and output of DC/DC converter 23. In this case, controllers 29 and 89 can accurately maintain the on-standby operation of DC/DC converter 23 such that power storage unit 25 is neither charged nor discharged; however, this requires current sensor 90. Therefore, the configuration may be appropriately optimally selected in accordance with required accuracy specifications.

According to Embodiments 1 and 2, controllers 29 and 89 determine whether vehicle 1002 decelerates or not based on the comparison between vehicle speed "v" and previous vehicle speed "vo"; however, their determinations are not limited to this. For example, controllers 29 and 89 may determine whether vehicle 1002 decelerates or not from a brake signal that is supplied from vehicle control circuit 31 when the brake pedal is depressed. In this case, although it is easily determined whether vehicle 1002 decelerates or not, the regenerative electric power cannot be recovered unless the brake pedal is depressed. Therefore, in the case that vehicle 1002 decelerates without the depressing of the brake pedal, with the driver operating the transmission to shift into a lower gear, the regenerative electric power generated is vainly wasted as heat. Accordingly, controllers 29 and 89 according to Embodiments 1 and 2 may preferably determine whether vehicle 1002 decelerates or not based on the comparison between vehicle speed "v" and preceding vehicle speed "vo".

In in-vehicle power supply devices 1001, 1003, and 1004, controllers 29 and 89 compare vehicle speed "v" of vehicle 1002 with predetermined speed "vk". Predetermined speed "vk" is the speed at which engine 15A ends the fuel cut during deceleration, as described above. Vehicle control circuit 31 outputs a fuel-cut signal while the fuel cut is performed, and ends the output of the fuel-cut signal when the fuel cut ends. When vehicle control circuit 31 ends the output of the fuel-cut signal, controllers 29 and 89 may determine that vehicle speed "v" decreases down to predetermined speed "vk", based on the fuel-cut signal.

In in-vehicle power supply devices 1001, 1003, and 1004 according to Embodiments 1 and 2, controllers 29 and 89 control DC/DC converter 23, with predetermined discharge voltage Vfd and predetermined charge voltage Vfc being as target voltages in order to charge and discharge power storage unit 25. In addition, both predetermined discharge voltage Vfd and predetermined charge voltage Vfc may be equal to the same constant voltage (e.g. 14.5 V), and controllers 29 and 89 may change voltage-instruction value Vg that is supplied to electric generator 11. This operation will be described below. Upon the regenerative electric power being generated, vehicle control circuit 31 outputs voltage-instruction value Vg to electric generator 11 such that electric generator voltage Va rises up to, for example, 15 V. This operation allows DC/DC converter 23 to operate to decrease load voltage Vf (or electric generator voltage Va) to 14.5 V; therefore, the thus-generated regenerative electric power can be stored into power storage unit 25. Conversely, if the regenerative electric power is discharged from power storage unit 25, vehicle control circuit 31 decreases voltage-instruction value Vg from 14.5 V to, for example, 14 V, and then, outputs voltage-instruction value Vg to electric generator 11. This operation allows DC/DC converter 23 to operate to increase either load voltage Vf or electric generator voltage Va up to 14.5 V;

therefore, the regenerative electric power stored in power storage unit 25 can be discharged to load 19 and main power supply 13. In this configuration, the voltage output from electric generator 11 is variable.

According to Embodiments 1 and 2, power storage unit 25 employs the electric double-layer capacitor, but may employ other capacitors, such as an electrochemical capacitor. Power storage unit 25 may be a secondary battery other than the capacitor. However, charging-status value SOC that indicates the electric power stored in the secondary battery is not proportional to storage unit voltage Vc. In this case, storage unit voltage Vc cannot be used as charging-status value SOC as in the case of the capacitor. In the case that the secondary battery is used as power storage unit 25, it is necessary that charging-status value SOC be set equal to the value that is obtained by time integration of the electric current flowing through the secondary battery caused by the charging and discharging. Accordingly, each of in-vehicle power supply devices 1001, 1003, and 1004 further includes a current sensor that detects the electric current flowing through power storage unit 25 composed of the secondary battery. Controllers 29 and 89 determine charging-status value SOC by time-integrating the electric current flowing through power storage unit 25. If the secondary battery is used as power storage unit 25, it is necessary that both upper limit value SOCu and lower limit value SOCk of charging-status value SOC be determined in advance for the secondary battery. The secondary battery may exhibits not large variations in the voltage even if it is charged and discharged. Therefore, in order to cause DC/DC converter 23 to operate on standby, it is necessary that the charging and discharging be not performed with higher reliability. Current sensor 90 of in-vehicle power supply device 1004 shown in FIG. 6 directly detects the electric current flowing between the input and output of DC/DC converter 23, and then, controllers 29 and 89 control DC/DC converter 23 such that the electric current does not flow.

A secondary battery has large internal resistance relative to capacitors, and is unable to easily accept electric current that increases abruptly. The secondary battery requires the complicated configuration and control method as described above. Consequently, the capacitor is preferably used as power storage unit 25, which allows the simple configuration and control with sufficient recovery of the regenerative electric power that is generated abruptly.

An in-vehicle power supply device for use in a vehicle according to the present invention can provides high efficiency by reducing power consumption of the DC/DC converter, with the recovering efficiency of the regenerative electric power being held. The in-vehicle power supply device is useful as in-vehicle power supply devices that have a function of recovering the regenerative electric power.

REFERENCE MARKS IN THE DRAWINGS

11 Electric Generator
13 Main Power Supply
19 Load
23 DC/DC Converter
25 Power Storage unit
29 Controller
89 Controller

The invention claimed is:

1. An in-vehicle power supply device for use in a vehicle including an engine and a load, the in-vehicle power supply device comprising:
   an electric generator configured to be connected electrically with the load;
   a main power supply connected electrically with the electric generator;
   a DC/DC converter;
   a power storage unit connected with the electric generator via the DC/DC converter, the storage unit being configured to be connected with the load via the DC/DC converter; and
   a controller for controlling the DC/DC converter,
   wherein the DC/DC converter is operable to:
      charge the power storage unit with regenerative electric power generated by the electric generator to store the regenerative electric power in the power storage unit; and
      discharge the stored regenerative electric power from the power storage unit to the main power supply and the load, and
   wherein the controller is operable to:
      stop the DC/DC converter when a charging-status value indicating a charging status of the power storage unit is not larger than a predetermined lower limit value;
      operate the DC/DC converter when the charging-status value is larger than the lower limit value and the vehicle ends deceleration; and
      operate the DC/DC converter when a speed of the vehicle is not lower than a predetermined speed and an accelerator position of the engine is not larger than a predetermined accelerator position, even if the charging-status value is not larger than the predetermined lower limit value and the vehicle is not in a deceleration state.

2. The in-vehicle power supply device according to claim 1, wherein the controller is operable to activate the DC/DC converter when (1) the charging-status value is larger than the lower limit, (2) the vehicle decelerates, and (3) the speed of the vehicle is lower than the predetermined speed.

3. The in-vehicle power supply device according to claim 1, wherein the controller is operable to:
   operate the DC/DC converter on standby if the speed of the vehicle is not lower than the predetermined speed while the vehicle does not decelerate the accelerator position is not larger than the predetermined accelerator position, even if the charging-status value is not larger than the predetermined lower limit value; and
   operate the DC/DC converter to charge the power storage unit with the regenerative electric power upon the vehicle starting decelerating.

4. The in-vehicle power supply device according to claim 3, wherein the controller causes the DC/DC converter to operate on the standby, by controlling the DC/DC converter such that no electric current flows between an input and an output of the DC/DC converter.

5. The in-vehicle power supply device according to claim 1, wherein the power storage unit includes a capacitor.

6. The in-vehicle power supply device according to claim 1, wherein the controller reads states of the accelerator position using data from a vehicle control circuit and operates the DC/DC converter based on the data from the vehicle control circuit.

* * * * *